United States Patent [19]

Camras et al.

[11] 3,874,606

[45] Apr. 1, 1975

[54] VIDEO TRANSDUCER SYSTEM AND CARTRIDGE THEREFOR

[75] Inventors: Marvin Camras, Glencoe; Stanley A. Galus, Chicago, both of Ill.

[73] Assignee: IIT Research Institute, Chicago, Ill.

[22] Filed: Aug. 21, 1972

[21] Appl. No.: 282,142

[52] U.S. Cl. .......... 242/55.19 A, 360/93

[51] Int. Cl. .......... B65h 17/48

[58] Field of Search .......... 242/55.19 A, 197, 198, 242/199, 200, 55.19 R, 100.2 Z; 274/4 B, 4 D; 179/100.2 Z; 360/93

[56] References Cited

UNITED STATES PATENTS

| | | | |
|---|---|---|---|
| 1,031,129 | 7/1912 | Lloyd | 242/55.18 |
| 2,911,215 | 11/1959 | Cousino | 242/55.19 A |
| 3,025,012 | 3/1962 | Fries | 242/55.19 A |
| 3,243,134 | 3/1966 | Reed et al. | 242/55.19 A |
| 3,285,526 | 11/1966 | Moore | 242/55.19 A |
| 3,773,272 | 11/1973 | Wallace | 242/55.19 A |

*Primary Examiner*—Billy S. Taylor
*Attorney, Agent, or Firm*—Hill, Gross, Simpson, Van Santen, Steadman, Chiara & Simpson

[57] ABSTRACT

In the illustrated embodiment a video cartridge contains an endless loop record tape with a multiplicity of channels, and a pair of pivotal guide arms for holding a length of tape in a taut condition to facilitate loading of the cartridge with the tape threaded between a capstan drive assembly and a transducer head. The downward movement of the cartridge into the operative position serves to retract the tape guides clear of the operating tape path. A tape tension arm is provided along the tape path in the cartridge and is so arranged as to apply tension to the tape as the cartridge is unloaded from the transducing machine. The tape reel in the cartridge is suspended on a bearing ball so as to provide very low resistance to rotation.

2 Claims, 32 Drawing Figures

VIDEO TRANSDUCER SYSTEM AND CARTRIDGE THEREFOR

CROSS-REFERENCES TO RELATED APPLICATIONS

Ann earlier application relating to an endless loop cartridge video transducing system in Camras application Ser. No. 60,806 filed Aug. 4, 1970 now U.S. Pat. No. 3,725,608 issued Apr. 3, 1973. The present application is concerned with improvements in the cartridge and related parts in comparison to the disclosure of said earlier application.

SUMMARY OF THE INVENTION

This invention relates to a cartridge type video transducer system and particularly to an improved endless loop magnetic tape cartridge for use in such a system.

It is an object of the present invention to provide a novel and improved endless loop cartridge configuration having guide arms for establishing a threading condition of a section of tape within the cartridge, the guide arms being automatically actuatable to a position clear of the tape path as the cartridge is loaded onto the transducer mechanism.

A further object of the invention relates to the provision of a tape tensioning arm cooperating with the pivtoal guide arms to establish tension on the tape of the cartridge as the cartridge is removed from the transport mechanism.

A feature of the invention relates to a novel cartridge configuration with an endless loop record tape including a coil of the record tape carried on the rotatable reel wherein the reel is suspended on a bearing ball for very low friction rotation thereof under the impetus of a capstan drive inserted into the cartridge adjacent the reel.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure.

BRIEF DESCRIPTION OF THE DRAWINGS

FIG. 15 is a fragmentary somewhat diagrammatic plan view similar to that of FIG. 14 but showing parts of the mechanism in the operating position;

FIG. 15A is a diagrammatic illustration of an electric circuit for controlling the gradual shifting of the head from one channel to the next in response to a signal from a photocell or the like;

DESCRIPTION OF PREFERRED EMBODIMENTS

Figure 1:
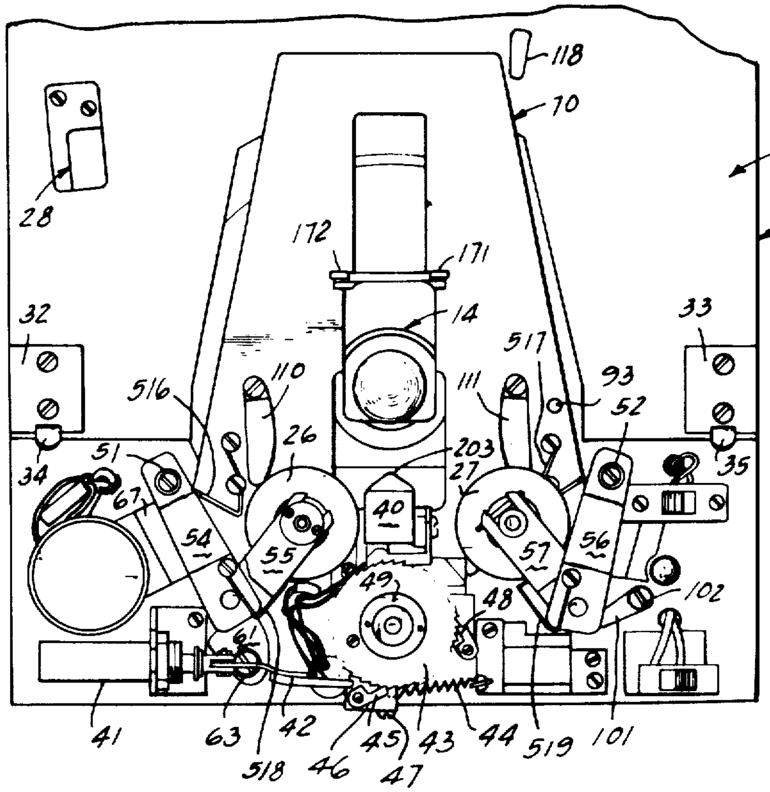
FIG. 1 is a partial somewhat diagrammatic plan view of a tape transport for an endless loop tape cartridge transducer system in accordance with the present invention.
Figure 3:
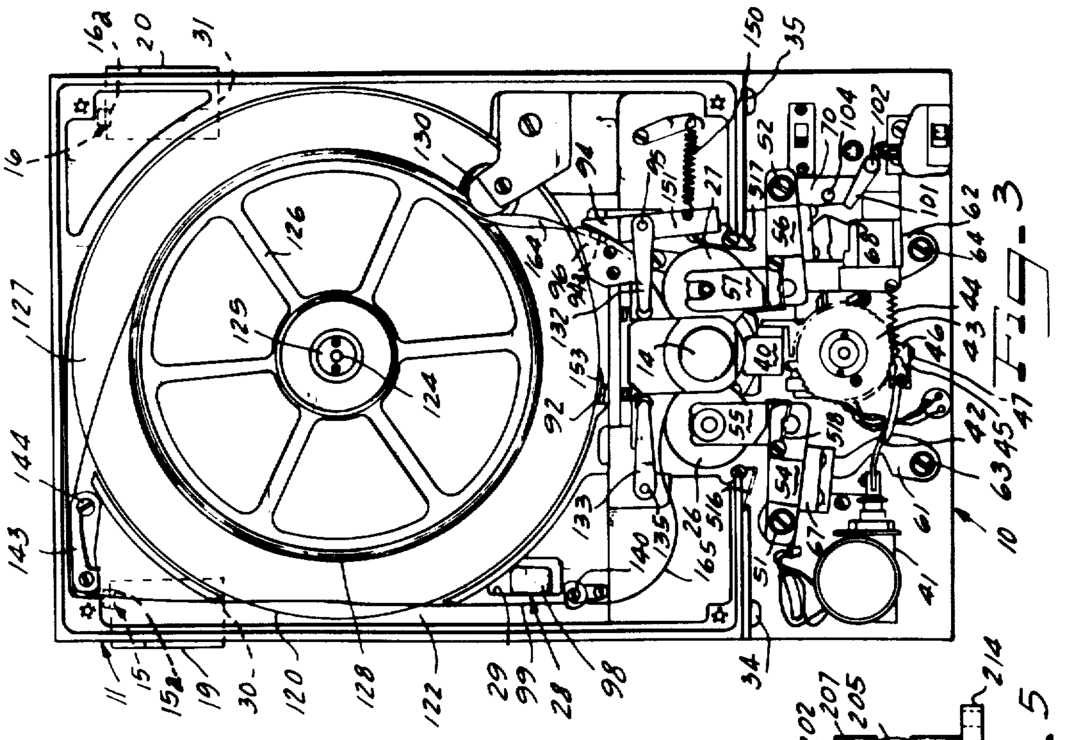
FIG. 3 is a somewhat diagrammatic plan view on the same scale as FIG. 2 showing the tape transport of FIG. 1 having the cartridge of FIG. 2 associated therewith and showing the transport mechanism in the operating condition.
Figure 2:
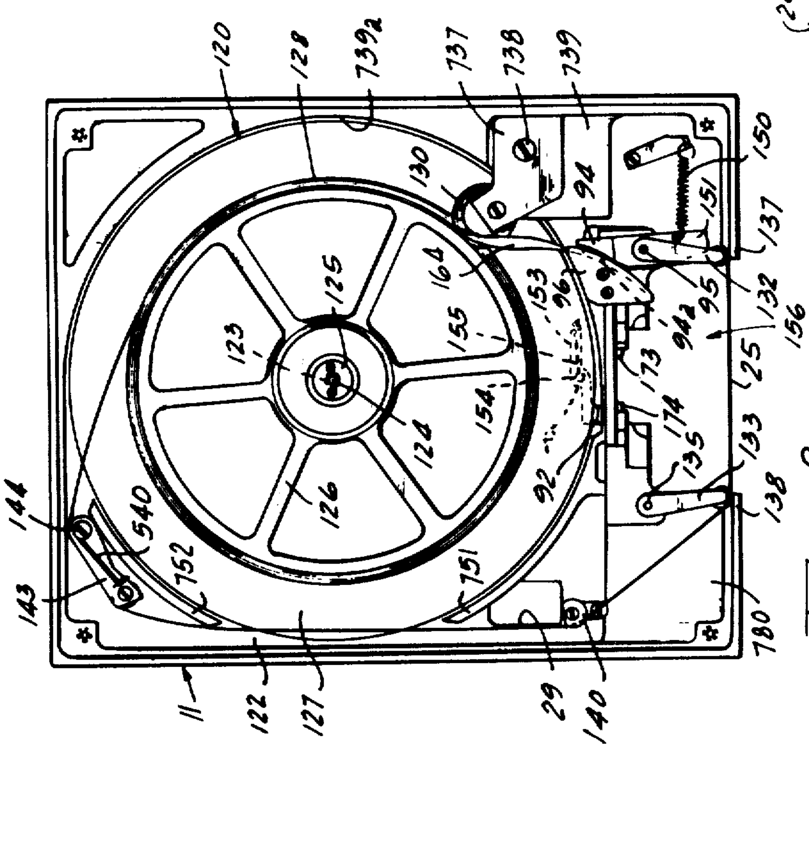
FIG. 2 is a somewhat diagrammatic plan view on a reduced scale of an endless loop cartridge for association with the tape transport of FIG. 1, with the top cover of the cartridge removed to reveal the internal construction.

Referring to FIG. 1 there is illustrated a tape transport 10 for removably receiving an endless loop tape cartridge such as indicated at 11 in FIG. 2 on sheet 2 of the drawings. The tape transport includes a support 12 for removably receiving the endless loop cartridge 11 and a capstan drive assembly 14 for driving the tape of the cartridge at video transducing speed during a transducing operation. The support 12 carries suitable cartridge positioning elements such as lugs indicated at 15 and 16 in the FIG. 3 for engaging in cooperating recesses of the cartridge to provide for a pivotal type of movement of the cartridge on the lugs as the cartridge is loaded onto the support 12. By way of example, the support 12 may further include elements 19 and 20 as indicated in FIG. 3 for laterally cconfining the cartridge 11 while accommodating pivotal movement of the cartridge from an inclined position to the operative position. As the cartridge is pivoted downwardly, the length of tape indicated at 25 in FIG. 2 is automatically threaded between the capstan drive assembly 14 and the retracted pressure rollers indicated at 26 and 27 in FIG. 1. As the cartride moves downwardly, a photocell assembly 28 on the cartridge support 12 moves through an aperture 29, FIG. 2, in the bottom of the cartridge so as to be disposed in operative relationship to the path of the tape carried by the cartridge.

The lugs 15 and 16 are mounted on flat pads 30 and 31 having a common level with pads 32 and 33, FIG. 1, so as to position the cartridge at a predetermined level on the support 12. Spring fingers 34 and 35 project upwardly from support 12 as indicated for finger 35 in FIG. 8 and serve to retain the cartridge securely in positioin. The lugs 15 and 16 include forwardly projecting fingers 15*a* and 16*a* *a*which overlie a rearwardly projecting ledge of the cartridge, the fingers hooking over the ledge so as to retain the rear part of the cartridge against inadvertent upward displacement.

Referring to FIG. 1 transducer head 40 is mounted on the transport 10 for shifting movement toward and away from the capstan drive assembly 14. Further, the head assembly is capable of indexing movement parallel to the axis of the capstan drive assemblly so as to scan along successive parallel channels extending lengthwise of the tape. The mechanism for indexing the head 40 includes a solenoid 41 having an actuating link 42 for successively indexing ratchet wheel 43 in cooperation with tension spring 44 and pawl 45. For the sake of diagrammatic illustration, FIGS. 1 and 3 show an arm 46 pivotally mounted near its center on pin 47, the arm being located so as to carry pawl 45 at its upper end and so as to connect with link 42 and spring 44 at its lower end. Retraction of link 42 towards the left by energization of solenoid 41 pivots arm 46 towards the right so as to advanace pawl 45. When the solenoid is deenergized the link 42 is restored by the pull of spring 44 to the position shown in FIG. 3. Thus pawl 45 is retracted while detent 43 locks ratchet wheel 43 against reverse rotation. The pawl 45 is spring urged in the counterclockwise direction as is detern 48, so that the manual knob (not shown) correspnding to knob 341, FIG. 10, may rotate ratchet wheel 44 in the counterclockwise direction to manually select any desired indexing position of the head. The parts associated with ratchet wheel 44 may include the parts driven by member 360, FIG. 13, so that the knob on shaft 49 in FIG. 3 may drive such parts (just as knob 418 drives parts 360 and 371 in FIG. 13) when the solenoid 41 is inactive. By way of example ratchet wheel 43 may have 40 teeth corresponding to 40 successive scanning positions of the head assembly 40. In the arrangement of FIG. 1, the indexing wheel 43 and the actuating components such as 41, 42, and 44-49 are all reciprocally movable with the head 40 toward and away from the capstan drive assembly 14.

On the other hand, capstan pressure rollers 26 and 27 are mounted by means of stationary pivot shafts 51 and 52, the rollers being carried by linkage arms 54, 55 and 56, 57 which are actuated so as to move toward the capstan drive assembly 14 along with the head 40. The linkage arms are actuated by means of cam arms such as indicated at 61 in FIG. 1 and at 61 and 62 in FIGS. 3 and 6 which have fixed pivot points 63 and 64 and which have rollers 65 and 66 riding in recesses provided between interior side walls of brackets 67 and 68, and the adjacent sides of arms 54 and 56, for the purpose of shifting the arms 54 and 56 from the positions shown in FIG. 1 to the positions shown in FIG. 3 as the head 40 is moved to the transducing position. A shiftable carrier including a side plate indicated at 70, FIGS. 1 and 6, carries the head assembly 40 and the associated indexing mechanism and also carries actuating pins as shown at 71 and 71*a* in FIG. 7, for pivoting the cam arms 61 and 62.

As will be explained hereinafter in greater detail, the plate 70 also carries a pin 91, FIGS. 6 and 7, for controlling a reel brake 92, FIGS. 3, 6 and 7, and carries a cam post 93 for controlling a tape drag element 94 which is pivoted at 95, and which drag element carries a felt pad 94*a* for pressing the tape against a fixed guide 96. Reel barke 92 and drag element 94 which is pivoted at 95, and which drag element carries a felt pad 94*a* for pressing the tape against a fixed guide 96. Reel brake 92 and drag element 94 are contained in the cartridge, through the latter could be part of the machine.

Preferably, the photocell assembly 28 which projects into the tape cartridge carries at its lateral face 98 a photocell exciting lamp, and a receiving photocell which is actuated in response to a light reflective strip (not shown) applied to the tape when such strip reaches the tape run as indicated at 99 in FIG. 3. In the absence of the reflective strip, the tape at path section 99 does not reflect sufficient light to the photocell to actuate the photocell circuit. The photocell circuit in turn controls actuation of the solenoid 41 so that the head 40 is indexed to scan a new channel each time the reflective strip reaches the photocell assembly 28.

Figure 8:
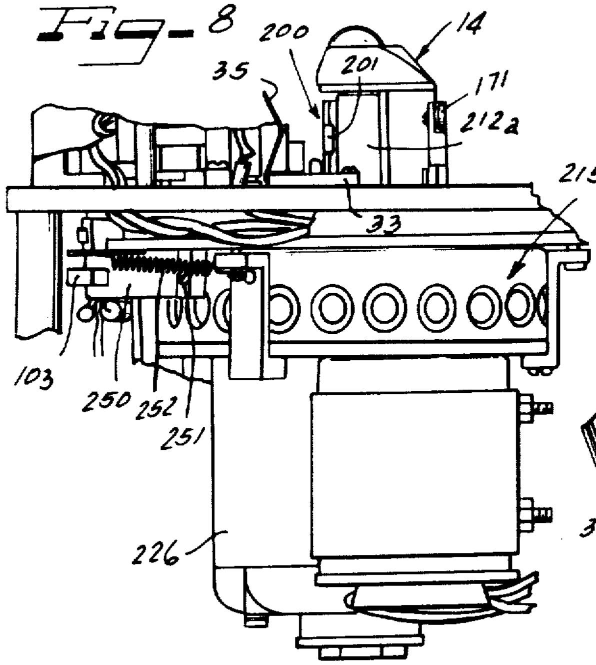
FIG. 8 (on sheet 1 of the drawings) is a fragmentary side elvational view of the tape transport of FIG. 1.

Additionally the tape transport 10 carries an actuating arm as indicated at 101 which is secured for actuating a vertical shaft 102 which in turn serves to control a flywheel brake assembly 103, FIG. 8. Pin 104, FIG. 3, on the shiftable carriage is so located that as soon as driving engagement between the tape and capstan drive assembly is released, arm 101 is actuated to apply the brake 103. The details of a preferred capstan flywheel brake will be described hereinafter in refrence to a second embodiment of the present invention. The pivot arms 110 and 111 carried on carriage plate 70, FIGS. 6 and 7, provide guide faces 110*a* and 111*a* for engagement with lower portions of the arms 55 and 57 (below rollers 26 and 27) as the carriage is advanced to operating position. Wire springs 112 and 113, FIG. 6, are actuated by arms 61 and 62 as the wire springs advance with the carriage to urge arm 110 countercockwise and arm 111 clockwise. Arms 110 and 111 in turn acts on arms 55 and 57 so as to establish pressure engagement between the capstan rollers 26 and 27, and the capstan drive 14. The extent of pivotal movement of arms 61 and 62 is selected so as to move the linkages 54 and 55 and 56 and 57 into the proper position before the wire springs 112 and 113 become effective.

Figure 9:
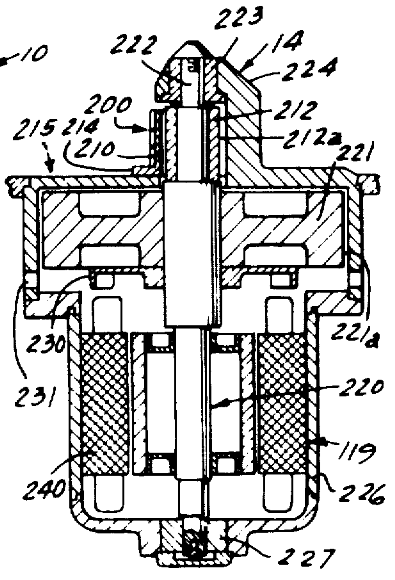
FIG. 9 (on sheet 1 of the drawings) is a vertical cross sectional view showing the capstan drive assembly of FIG. 8 in cross section.

As the slide plate 70 moves to the operating position, its right-hand edge as viewed in FIG. 1, actuates a microswitch actuating arm 118 which serves to actuate a microwswitch controlling the energizing circuit for capstan motor 119, FIG. 9, so as to begin driving the tape past head 40. Similarly the capstan motor is deenergized by virtue of a spring acting on arm 118, as the carriage plate 70 is returned to the load position shown in FIG. 1.

The capstan drive rollers preferably have the configuration shown in the seventh figure of my copending application Ser. No. 60,806 for the purpose of establishing a substantial tension in the tape loop being scanned by the transducer head 40. The groove in capstan roller 27 is wider than the tape and may have a depth of 0.0015 inch, so that the tape engaging diameter of roller 27 is 0.003 inch less than that of roller 26.

Referring to FIGS. 2 and 3 on sheet 2 of the drawings, the cartridge 11 includes a reel 120 mounted for rotation on a central bearing with minimum friction. By way of example, the base plate 122 of the cartridge may have an upstanding bearing post as indicated at 123, and a bearing ball 124 may be interposed between the flat upper face of the bearing post 123, and a conically shaped seat carried by hub portion 125 of reel 120, so that reel 120 is supported by means of the ball 124 for relatively free rotation on the post 123. An axially elongated sleeve of hub portion 125 closely receives post 123 to maintain the reel in a horizontal condition while freely accommodating rotation thereof. The hub 125 of the reel 120 is made as light as possible consistent with structural rigidity and includes a central annular portion and outer hub portion joined by thin radial arms such as indicated at 126. A lower radial flange 127 extends from the lower side of the hub 125 and mounts a coil 128 of record tape wound on the hub 125. The inner end of the coil 128 extends over a contoured guide surface 130 formed of a low friction material. The tape engaging portion of the guide 130 is contoured so as to require a minimum distortion in the natural tape path from the inner side of coil 128 to the path between the tape drag elements 94 and 96. The tape after passing between the drag elements 94 and 96 passes about guide pins carried at the free ends of arms 132 and 133 which have fixed pivot points at 95 and 135 respectively. A bias spring (not shown) urges the arms 132 and 133 counterclockwise and clockwise respectively so as to maintain the tape adjacent the wall portions 137 and 138 of the cartridge and thus retain the tape section 25 in a relatively taut condition. From the pin of pivotal guide arm 133, the tape passes about a flanged guide post 140 and past aperture 29, and then about a flanged pin on tensioning arm 143 which is pivotally mounted at 144. From pivot shaft 144, the tape returns and is wound on the outer side of coil 128. A tension spring is indicated at 150 for urging a drag arm 151 in the counterclockwise direction about pivot point 95 so as to urge the movable drag element 94 toward theh fixed drag element 96.

Referring to FIG. 2, the spring bias on arms 132 and 133 supplies sufficient tensioning action to the tape so that the tensioning arm 143 is held so as to place its spring under substantial torsion and thus maintain the free loop under tension. The reel 120 is held against rotation by means of the reel brake 92.

Figure 7:
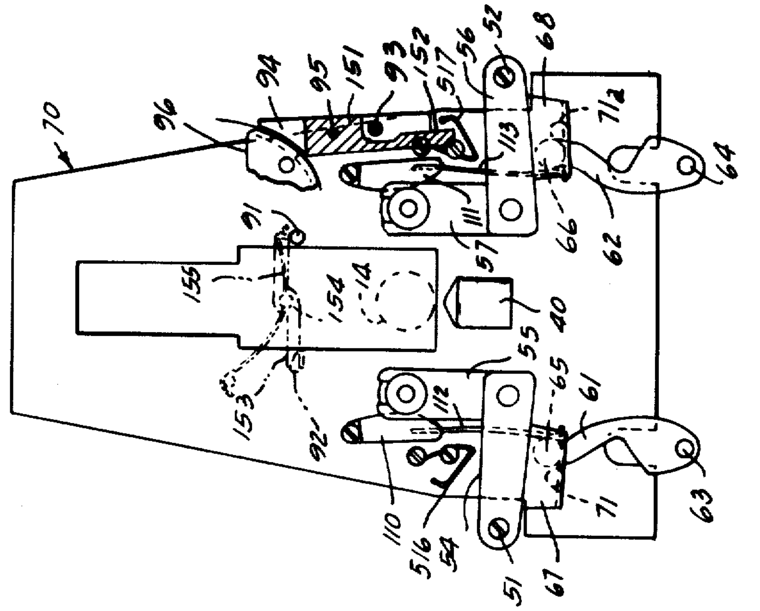
FIG. 7 is a view on the same scale as FIG. 6, but showing the relative position of the parts in the operating condition of the transport mechanism.

Cam post 93, FIG. 1, has a cam face which cooperates with a flange 152, FIG. 7, depending from arm 151, so as to release the clamp of drag element 94 when the cartridge is loaded on to the tape transport of FIG. 1. The flange 152 on arm 151 is so arranged as to maintain the drag 95 in released condition until the head carriage reaches approximately 90% of its travel toward the engaged position shown in FIG. 3. The arm 151 is then released, so as to allow the tension spring 150 to apply drag force on the tape between elements 94 and 96. Correspondingly, when the head carriage is retracted, the drag force exerted by elements 94 and 96 is released substantially contemporaneously with the release of driving pressure between the tape and the capstan drive assembly 14. When the capstan stops driving, the takeup tension of the tape as it winds on to the outside of the coasting reel 120 is too low to overcome the drag of elements 94 and 96. Consequently if the drag at elements 94, 96 were not released, the rotation of the reel would supply a slack tape loop in advance of the drag elements 94 and 96 until such time as the coil 128 became too tight to permit further rotation of the reel. The slack loop might jam, while the tightened coil might disturb subsequent normal operation.

To stop the coasting reel smoothly and quickly a leather brake shoe 92 is carried on an arm 153 which is pivoted on axis 154 against the action of a wire spring 155 by means of the pin 91, FIGS. 1 and 7, as the carriage 70 is advanced to the operating position.

It will, of course, be noted that the bottom wall 122 of the cartridge is provided with an aperture as generally indicated at 156, FIG. 2, so as to receive the capstan drive assembly 14 within the tape loop 25 as the cartridge is loaded onto the transport 10.

In the engaged position of the transport as indicated in FIG. 3, wire springs 112 and 113, FIG. 7, serve to urge the capstan pressure rollers 26 and 27 against the capstan so as to establish an isolated tape loop extending from an incoming side of the capstan drive to an outgoing side of the capstan drive, the drag elements 94 and 96 acting on an incoming tape path section such as indicated at 164, FIG. 3, and an outgoing tape path section such as indicated at 165 having essentially zero tension, but being sufficiently guided so as to pass in close proximity to the photocell assembly 28 which carries the lamp and photocell previously referred to. It will be noted that throughout the incoming tape path 164 from the inner side of coil 128 to the incoming side of the capstan drive assembly, the tape follows a path having a total amount of bending of substantially less than 90°, and in fact less than 45°, so as to enable a relatively free movement of tape. If the tape had a relatively substantial bend at the incoming path section, this would tend to amplify any flutter which might occur along the incoming path section. The tape drag elements 94 and 96 apply a relatively substantial drag force which in conjunction with the capstan drive assembly provides a tape tension at the transducer head 40 in a range from about 1 to 4 ounces for a ¼ inch tape.

The space between the level of the flange 127 of reel 120 and the bottom wall 122 is appreciably less than the width of the tape, for example 1/16 inch. The reel 120 might be one half to two thirds full where the length of tape was to provide 40 channels with a capacity of 1 hour of playing time at 120 inches per second. The constant friction supplied by the drag elements 94, 96 tends to swamp out any irregularities in tape motion, for example due to variations in the friction exerted by the coil 128 as the tape is unwound from the inner side thereof, and is important in proper guiding of the tape over the pressure rolls, capstan, and head.

As seen in FIG. 3, the flywheel brake operating arm 101 assumes a position adjacent its actuating pin 104 so that the brake is applied to the capstan flywheel as soon as the capstan drive is released by retraction of the capstan pressure rollers 26 and 27. The tape remains somewhat loosely at the capstan when the rollers are retracted, but re-engages perfectly if the rollers are brought again to drive position. The tape section 25 is brought to the taut condition shown in FIG. 2 when the cartridge is removed from the machine and the arms 132 and 133 return to the loading positions as shown in FIG. 2 under impetus of their spring bias.

The mechanism for shifting the arms 132 and 133 to the operating position as the carriage is loaded on the machine will be explained in connections with FIGS. 27–30. Briefly, however, the machine carries actuating rollers 171 and 172, FIG. 1, which engage inclined edges of slide plates 173 and 174, FIG. 2, as the cartridge is pivoted into the operating position. As the carriage is pressed downwardly into the operating position, the rollers 171 and 172 force the slide plates 173 and 174 laterally against the action of spring bias. A suitable lost motion type linkage couples the slide plates 173 and 174 with the pivot shafts 95 and 135, causing arm 132 to rotate in the clockwise direction, and causing arm 133 to rotate in the counterclockwise direction until the arms reach the operating positions as shown in FIG. 3. (The arm 151 is freely rotatable relative to the pivot shaft 95, the pivotal movement of the arm 151 relative to shaft 95 having been previously explained.)

Figure 5:
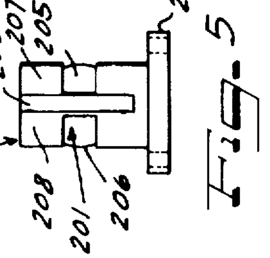
FIG. 5 is a somewhat diagrammatic front elevational view of the crescent guide element of FIG. 4.
Figure 4:
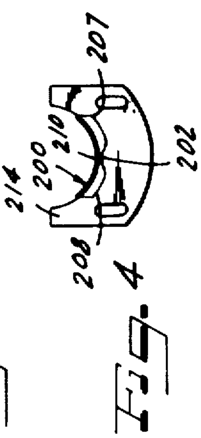
FIG. 4 is a somewhat diagrammatic top plan view of the crescent guide element of the transport of FIG. 1 and showing the crescent guide at its full size.

FIGS. 8 and 9 (on sheet one of the drawings) illustrate a preferred capstan-head arrangement generally corresponding to that illustrated in the prior Camras applications Ser. No. 44,510 filed June 8, 1970 now U.S. Pat. No. 3,702,906 issued Nov. 14, 1972, and Ser. No. 60,806 filed Aug. 4, 1970 now U.S. Pat. No. 3,725,608 issued Apr. 3, 1973. The capstan drive assembly 14 includes a tape guide 200 providing sliding support for the tape as it travels along the loop path between the incoming and outgoing sides of the capstan. As best seen in FIGS. 4 and 5 (on sheet 2 of the drawings), the tape guide 200 is provided with a tape guide channel 201 which extends across a vertically extending recess 202. As seen in FIG. 4, the recess 202 has a generally concave configuration in cross section which is adapted to accomodate the generally convex tape engaging face 203, FIG. 1, of the head assembly 40. As best seen in FIG. 5, the tape channel 201 is defined by tape engaging guide surfaces 205 and 206, having a crowned or bulging configuration (shown exaggerated), so that the tape has a slight lateral curvature in cross section over the extent of the tape channel 201 except in the vicinity or the recess 202. At the transducing region of the tape path where the tape spans recess 202 and is engaged by the transducer head 40, the tape may have a substantiallyy flat or rectangular cross section configuration, or even have an opposite lateral curvature, if the head 40 has a crowned configuration such as illustrated in the first FIGURE of the copending application Ser. No. 90,773 filed Nov. 18, 1970 now U.S. Pat. No. 3,713,212 issued Jan. 30, 1973. The stationary tape guide surfaces 205 and 206 are of generally arcuate configuration, conforming to the configuration of the outer edges of sections 207 and 208 of the guide 200 as illustrated in FIG. 4. The tape guide surfaces 205 and 206 are of a length in the direction of movement of the record tape so as to provide sliding support for the record tape loop over substantially the entire length thereof which is out of engagement with the capstan. With the head 40 in the operating position, the tape is also provided with sliding support at the tape engaging surfaces 203 of the head.

The tape guide 200 further comprises a magnetic shielding member as indicated at 210 in FIG. 4 which is interposed between the capstan drive sleeve 212, FIG. 9, and the record tape loop which extends along the guide channel 201, FIG. 5. The magnetic shielding member 210 may be formed of a thin sheet of magnetic material disposed in close conforming relation to the tape engaging surface 212*a* of the campstan sleeve 212, while being slightly spaced therefrom to accommodate free rotation of the capstan. By way of example the magnetic shielding member may be made of "Permalloy" having a composition of 4% molybdenum, 78% nickel, and the remainder iron and minor constituents. The remainder of the tape guide 200 may be of thin electrically conductive material such as bronze with a hard chrome plating on its wearing surfaces. Crowned guide channels 201 were found advantageous in guiding the tape with a minimum of tension. Optimum crowing of about 1.5 inch radius gave the steadiest picture for an embodiment in accordance with FIGS. 1–9, but with very light tape drag. As seen in FIG. 9, base 214 of the tape guide 200 may be fixedly secured to housing 215 of the capstan drive assembly 14.

As best seen in FIG. 9, in a preferred arrangement, a capstan shaft 220 has capstan sleeve 212 rigidly fixed on integral therewith and has a flywheel 221 rigidly fixed on the shaft 220. The sleeve is bronze, brass or similar non-magnetic material with a surface of hard chrome. The shaft 220 is prepferably of hard magnetic steel. The non-magnetic capstan sleeve and surface prevents spurious pickup from the magnetic shaft by the nearby head which is very sensitive to even the slightest magnetization of a close spaced capstan.

With a head-adjacent-capstan configuration, a non-magnetic stainless steel shaft was found to have poor bearing qualities and further even when carefully de-magnetized still had sufficient permanent magnetization to introduce undesirable noise levels into the head winding. Other nonmagnetic materials which might be used have poor bearing qualities particularly at high speeds such as 3600 rpm. A reduced diameter portion 222 of the rotor shaft is journalled in an upper bearing 223 which is supported by a rigid frame portion 224 which may be an integral part of the capstan housing 215. The casing 226 of the capstan drive motor 119 is rigidly secured with the housing 215. The rotor of the motor 119 is directly secured to capstan shaft 220, and the shaft is journalled by means of a bearing 227 below the rotor. With this arrangement, a much steadier capstan motion is insured. Because of the steady motion thus achieved, the output from this magnetic head assembly 40 can be suplied directly to a conventional television receiver without the need for special flutter compensation circuits, in accordance with the illustration in the second figure of my copending application Ser. No. 60,806. As explained in this copending application, capstan shaft 220 may have a diameter corresponding to the outside diameter of sleeve 212 to itself provide the capstan drive surface 212*a*. An exhaust impeller blade is indicated at 230 for rotation with the capstan shaft 220 to exhaut air from the housing 215 through apertures such as indicated at 231. Suitable air intake apertures may be provided at the lower end of the casing of motor 226 below stator 240 as viewed in FIG. 9. In addition to sleeve type bearing 227 at the lower end of the shaft 220, a thrust bearing in the form of a ball 241 is shown in FIG. 9. The capstan-flywheel-rotor component including shaft 220, sleeve 212, flywheel 221 impeller 230 and rotor 242 is dynamically balanced such that vibration and noise is reduced to a negigible amount.

Referring to FIG. 8, it will be observed that the capstan brake 103 is reciprocally guided by means of a fixed casing 250 secured by means of screws such as indicated at 251 to the capstan housing 215. A tension spring is indicated at 252 which in one embodiment in accordance with FIGS. 1–9 serve to release the capstan brake 103 upon disengagement of the pin 104 from the arm 101, FIG. 3, as the carriage plate 70 moves to the operating position shown in FIG. 3. In this embodiment, as the carriage plate is retracted, pin 104 engages arm 102, and rotation of arm 102 drives plunger 103, FIG. 8, inwardly so that the brake shoe of the inner end of the plunger 103 engages the periphery 221*a* of the flywheel 221, FIG. 9, with the desired braking pressure. In a preferred embodiment, the parts are rearranged so that the spring serves to apply the braking pressure as the slide plate is retracted toward the loading position. In this preferred embodiment, a pin on the carriage plate 70 serves to release the brake as the carriage plate is moved from the loading position, the flywheel brake being maintained in the disengaged condition by the pin with the parts in the operating position as shown in FIG. 3. The details of a preferred flywheel brake arrangement are described in connection with a second embodiment of the present invention to be described hereinafter.

It may be noted that FIG. 1 is based on a photograph of an actual embodiment, the photograph having been taken at a slight angle to the vertical, so that the parts in FIG. 1 are seen in some portions with a slight degree of parallax.

EMBODIMENT OF FIGS. 10–18

Figure 10:
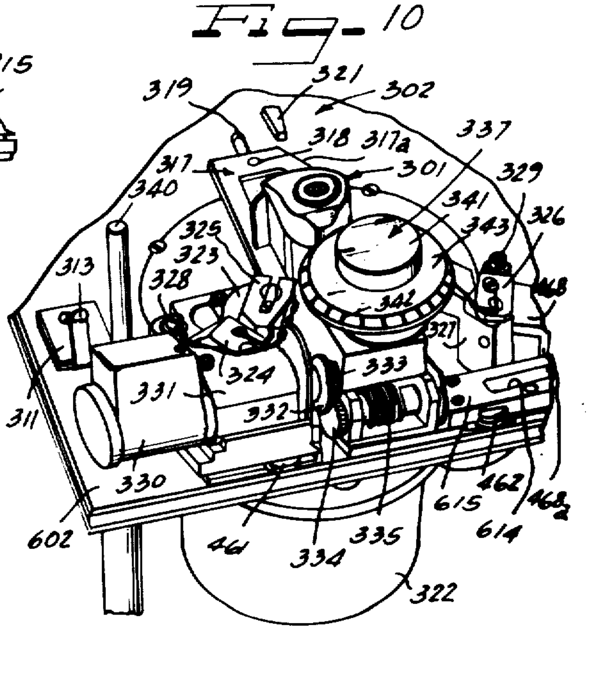
FIG. 10 (on sheet 1 of the drawings) is a somewhat diagrammatic perspective view showing a modified form of tape transport in accordance with the present invention.

Referring to FIGS. 10–18, a preferred embodiment of the present invention is illustrated wherein capstan drive assembly 301 essentially corresponds to the capstan drive assembly 14, FIG. 1, and includes a capstan-motor-flywheel assembly such as illustrated in FIG. 9, and includes a tape guide in association therewith corresponding to that illustrated in FIGS. 4 and 5. The embodiment of FIGS. 10–18 includes a cartridge support 302 essentially corresponding to that indicated in FIG. 1 including a photocell assembly 303, FIG. 14, corresponding to that shown at 28 in FIGS. 1 and 3. Pivotal loading of the cartridge is accommodated by elements 304–307 corresponding to elements 15, 16, 19 and 20 in FIG. 3. As in the previous embodiment, pads are provided at 309 and 310 adjacent the retaining lugs 304 and 305, and pads 309 and 310 are at the same level as pads 311 and 312 so as to provide level support for the cartridge. Spring fingers 313 and 314 are located at the forward edges of pads 311 and 312 in a manner analogous to the placing of spring fingers 34 and 35 in FIG. 1. Thus, as the cartridge is pivoted downwardly into the operating position, spring fingers 313 and 314 insure the interlocking of the cartridge with the overhanging fingers 304*a* and 305*a* of lugs 304 and 305. A slide plate 317 is indicated in FIG. 10 which corresponds essentially to the slide plate 70 of FIG. 1, and includes a pin 318 sliding within an elongated slot 319 as the slide plate 317 is reciprocated from the loading position indicated in FIG. 14 to the operating position shown in FIG. 15. Slide plate 317 is provided with a cam edge 317*a* for actuating a microswitch arm 321 to start capstan motor 322 as the slide plate 317 reaches the operating position. Capstan pressure rollers such as indicated at 323 correspond essentially to the capstan pressure rollers 26 and 27 and are mounted for pivotal movement by means of linkage arms such as indicated at 324 and 325, FIGS. 14 and 15, and 326 and 327, FIG. 10, corresponding to the pivot arms 54, 55 and 56, 57 in FIG. 1. The arms 324 and 326 are mounted on fixed pivots 328 and 329, carried by the support 302 clear of the path of movement of the slide plate 317.

A distinctive feature of the embodiment of FIGS. 10–18 resides in the use of a motor energized head indexing movement whereby the head gradually moves from one channel to the next in such a way as to prevent transients during continuous playing of successive channels. Specifically, the drive for the head indexing mechanism includes a drive motor 330, a reducing gear section 331, a control cam 332, spur gears 333 and 334 and worm 335 which serves to drive a worm wheel mounted coaxially with the head indexing mechanism 337.

Referring to FIG. 10, an enclosure may be provided for components such as 330–335, and such enclosure may be threadedly secured to a post such as indicated at 340 at each side of the transport. A manually operated knob 341 may be attached to the remaining parts of the head indexing assembly 337, so that the knob 341 may be on the upper side of the enclosure and be coupled with the remaining parts of the head indexing mechanism lying within the enclosure. Indicia such as indicated at 342 may cooperate with a suitable pointer and may be suitably numbered so as to represent the channel being scanned by the head assembly. For example, one index line may have associated therewith on the surface 343 the number 35 indicating that when this index line is aligned with the pointer, the head assembly will be scanning channel number 35 on the record tape.

Figures 11, 12, 13, 13A, 16, 17:
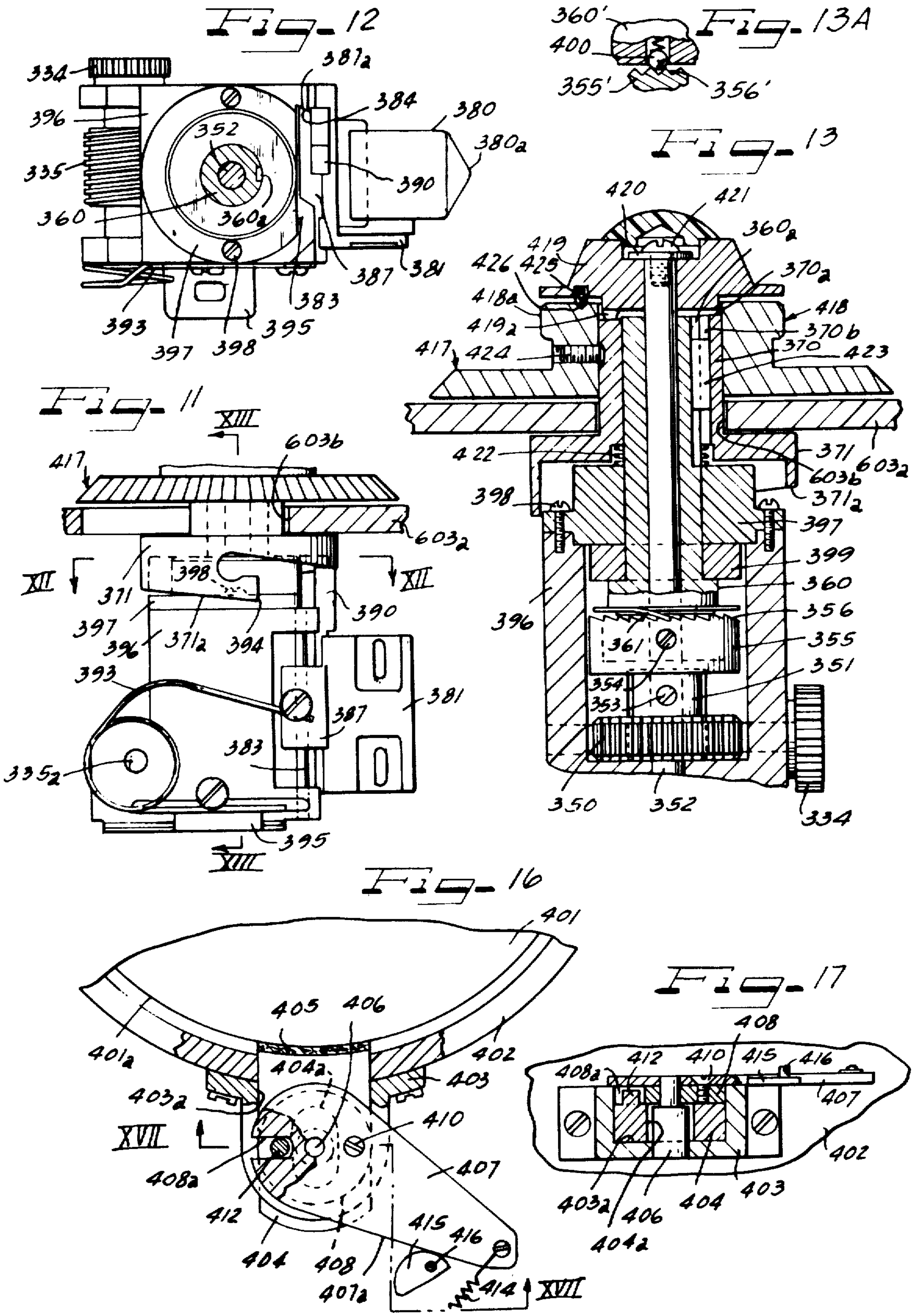
FIG. 11 is a partial somewhat diagrammatic side elevational view showing a head indexing mechanism suitable for the embodiment of FIG. 10.
FIG. 12 is a somewhat diagrammatic horizontal sectional view taken generally along the line XII—XII of FIG. 11.
FIG. 13 is an enlarged partial vertical sectional view taken generally along the line XIII—XIII of FIG. 11, and showing further features of preferred head indexing mechanism, which features are not present in the head indexing mechanism of FIG. 10.
FIG. 13A is a fragmentary vertical sectional view illustrating a bidirectionally operative detent providing a releasable coupling in the head indexing drive train.
FIG. 16, (on sheet 4 of the drawings) is a somewhat diagrammatic fragmentary enlarged horizontal section view, with certain parts broken away and in section, to illustrate details of construction and illustrating a preferred capstan flywheel brake assembly specifically correlated with the cartridge receiving mechanism of FIGS. 14 and 15.
FIG. 17 is a somewhat diagrammatic partial vertical sectional view taken generally along the line XVII-XVII of FIG. 16.

Referring to FIGS. 11–13, details of a preferred head indexing assembly are diagrammatically shown. This head indexing assembly is similar to assembly 337 in FIG. 10 but incorporates certain additional features. Spur gear 334 and worm 335 are shown in FIG. 12, and worm 335 has a reduced shaft portion 335*a* which is visible at the lower left in FIG. 11. The worm 335 drives a worm wheel 350, FIG. 13. The worm wheel 350 is provided with a hub portion 351 secured by set screw 353 to a vertical shaft 352. A set screw 354 secures a ratchet tooth member 355 to shaft 352 so that worm wheel 350 drives ratchet tooth member 335 having an annular series of ratchet teeth along an upper edge thereof as indicated at 356. A ratchet follower sleeve 360 fits over shaft 352 and includes a ratchet finger 361 for cooperating with the series of ratchet teeth 356. Specifically, rotation of the rachet member 355 by means of the worm wheel 350 is effective to drive the member 360 therewith by virtue of the coupling between the ratchet finger 361 and the ratchet teeth 356. On the other hand, a knob 418 generally similar to knob 341, FIG. 10, is telescoped over a sleeve 370 of a cam member 371, so that the cam member 371 may be directly rotated by means of the manual knob 418 without rotation of the worm 335. Specifically, as the knob 418 is rotated, the ratchet finger 361 rides over the successive ratchet teeth 356, the ratchet member 355 thus remaining stationary. On the other hand, as the worm 335 is driven, the cam member 371 and the indicator knob 418 are both rotated therewith. Thus, the head indicated at 380, FIG. 12, may be advanced automatically to successive channels by means of the motor drive, or the head may be set at any desired channel by manual operation of the knob 418.

Figures 15, 15A:
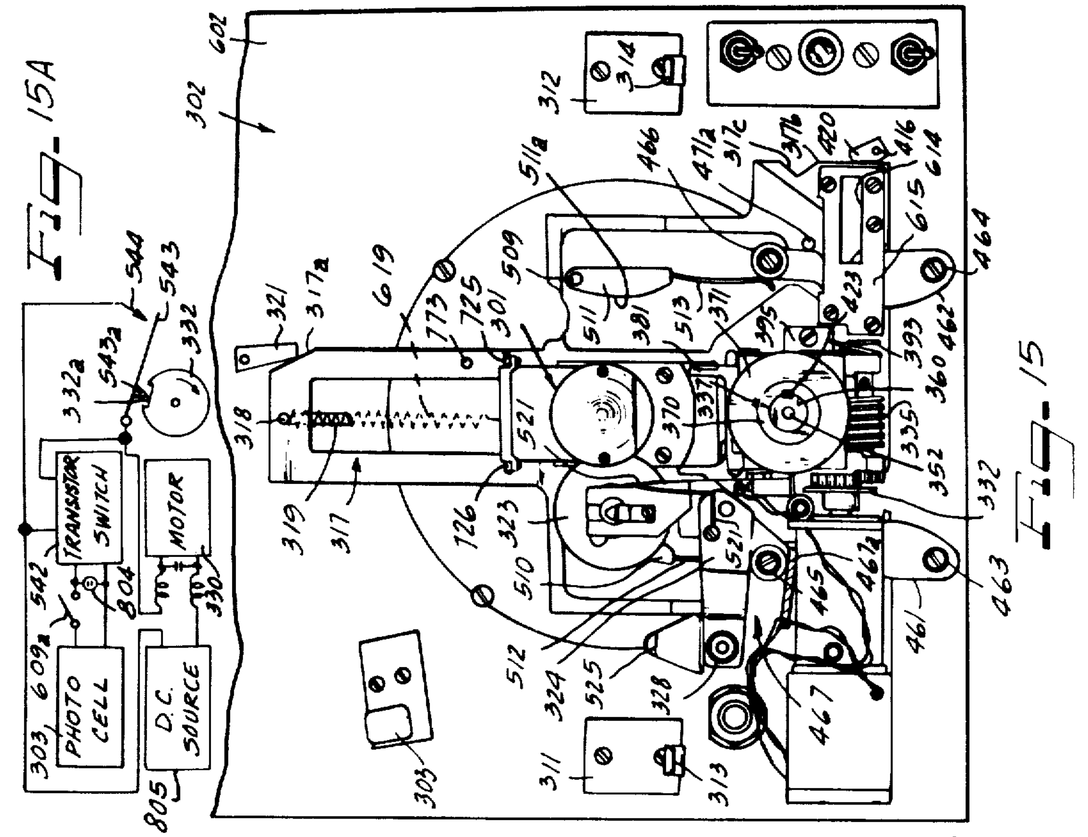
Figure 14:
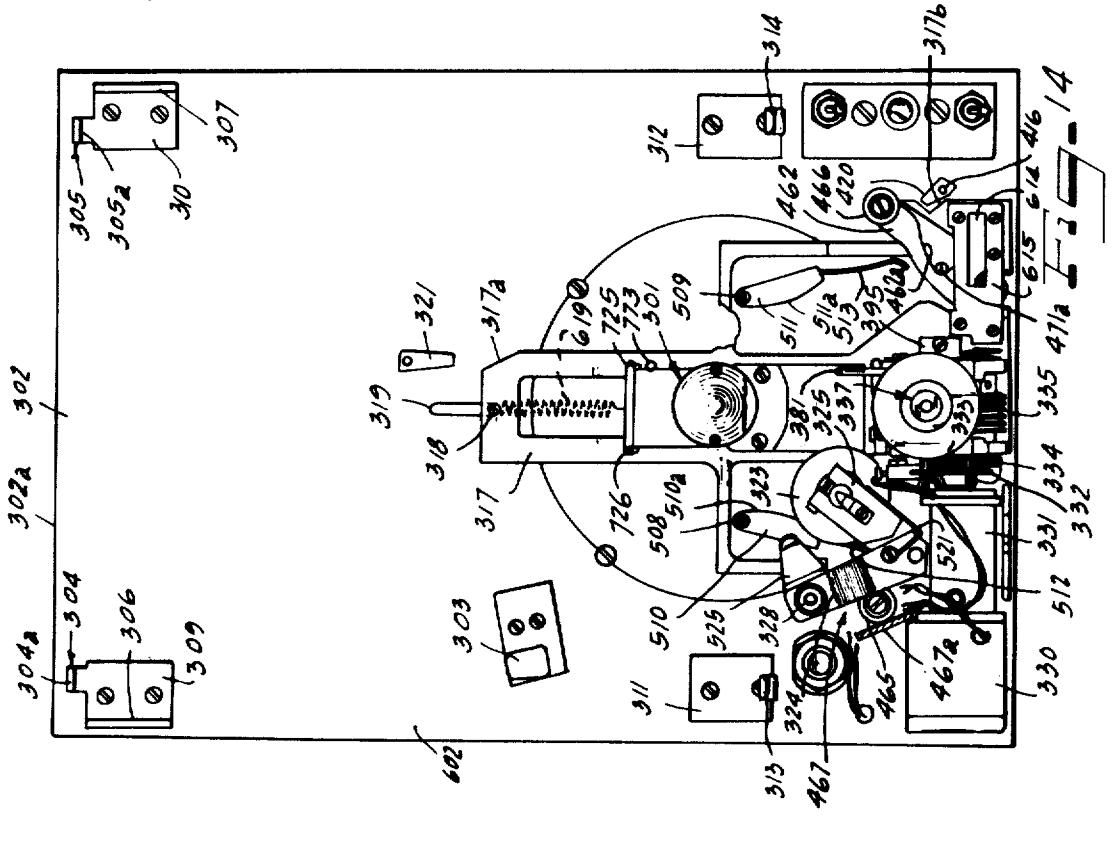
FIG. 14 (on sheet 5 of the drawings) is a somewhat diagrammatic plan view of the cartridge receiving mechanism applicable to the embodiment of FIG. 10, but with certain parts removed to show further details thereof.

The head 380 is carried by means of a bracket 381 which is guided for vertical reciprocation by means of a guide rod 383, and a guide groove as indicated at 384. The head slide 387 includes an aperture slidably receiving guide rod 383 and includes a beveled edge 387*a* confined by the guide groove 384. The head slide 387 carries a cam follower 390 which rides on the cam edge face 371*a* of cam member 371. The head slide 387 is shown in an intermediate position in FIG. 11 and is urged upwardly by means of the hairpin spring 393. As cam member 371 is rotated, cam follower 390 follows along the cam edge 371*a* to progressively depress the head 380 against the action of the spring 393. When the head reaches the lowermost position, further rotation of cam member 371 (in clockwise direction as viewed in FIG. 12) causes the follower 390 to move beyond point 394 on the cam edge face 371*a* so that the head 380 is returned to the upper position by action of spring 393; thus the head returns to the first channel and the indexing cycle is repeated. A bracket 395, FIGS. 11 and 12, serves to fasten casing 396 of the head indexing mechanism to slide plate 317 as shown in FIGS. 14 and 15.

The casing has a journal member 397 secured therewith by screws 398, and the journal member 397 together with spacer 399 accommodate rotation of sleeve 360 while preventing any substantial axial movement thereof. FIG. 12 shows a sectional view along lines XII—XII of FIG. 11, but with cam member 371 removed from sleeve 360 to show underlying parts with greater clarity.

In FIG. 11, the cam 371 is shown about one-quarter of a revolution beyond the position where the head is in scanning relation to the upper channel (channel No. 1) on the tape. Thus the head still has at least about 3/16 inch of downward travel from the position shown in FIG. 11 before it reaches its lowest position, where the tape width is ¼ inch. While slide 387 is shown approximately midway along the vertical-extent of guide rod 383 in FIG. 11, nevertheless the dimensions shown in FIG. 11 are such that slide 387 can still move downwardly the required distance of almost ¼ inch.

FIG. 13A shows a modification of the head indexing drive train of FIG. 13 wherein member 355' which is secured to shaft 352 as indicated for member 355 in FIG. 13, drives a follower sleever 360' corresponding to ratchet follower sleeve 360 in FIG. 13. In place of ratchet finger 361, sleeve 360' carries a spring urged detent ball 400 which coacts with symmetrical detent teeth 356'. The spring urged detent ball 400 acts against teeth 356' with sufficient force to insure that worm 350 will drive cam member 371 in the same way as for the embodiment of FIG. 13. Knob 418, however, may be turned in either direction when the bidirectional detent of FIG. 13a is substituted for parts 355, 356, 360 and 361 in FIG. 13.

FIGS. 16 and 17 illustrate details of a capstan flywheel brake similar to that indicated at 103, FIG. 8, and described in referernce to the previous embodiment. Thus, capstan motor 322 has a flywheel 401, FIG. 16, thereon corresponding to the flywheel 221 shown in FIG. 9. The flywheel housing 402 has a casing 403 secured therewith corresponding to casing 250, FIG. 8. The casing 403 includes an interior wall 403*a* for reciprocally mounting a plunger 404 carrying brake shoe 405.

For actuaing plunger 404, casing 403 is provided with a pivot shaft 406 pivotally mounting a lever 407. The lever 407 has secured therewith a circular disk 408 which is rotatably journaled in a circular receiving aperture of casing 403. The lever 407 is fixedly secured with pivot disk 408 by means of a screw as indicated at 410. Plunger 404 is provided with an elongated aperture 404*a* receiving the pivot shaft 406 therethrough so as to accommodate reciprocal movement of the plunger 404 toward and away from the flywheel 401. The lever 407 is coupled with plunger 404 by means of a slot 408*a* disposed radially in the circular member 408 and a pin 412 fixedly secured to plunger 404. Thus, as lever 407 and disk 408 pivot about shaft 406, a radial wall of slot 408*a* engages pin 412 so as to drive the plunger 404 toward or away from the flywheel 401. A tension spring is diagrammatically indicated at 414 which acts on the free end of lever 407 so as to tend to rotate the lever in the clockwise direction about shaft 406 as viewed in FIG. 16, so as to tend to establish pressure braking relation between brake shoe 405, which may be of leather, and the periphery 401*a* of flywheel 401. To release the braking force on the flywheel 401, an actuating cam 415 is provided in engagement with side edge 407*a* of lever 407, cam 415 being rotatable with its shaft 416 in a clockwise direction to rotate lever 407 in a counterclockwise direction about shaft 406 in retracting plunger 404 and brake shoe 405 away from the periphery 401*a* of flywheel 401. When the actuating cam 415 is released for rotation in the counterclockwise direction back toward the position shown in FIG. 16, tension spring 414 serves to apply the brake to the flywheel.

Referring to FIGS. 14 and 15, actuating shaft 416 is shown as extending through support 302 and carrying an actuating finger 420 disposed for engagement with an edge 317*b* of slide plate 317 as the slide plate is moved from the loading position shown in FIG. 14 to the operating position shown in FIG. 15. This movement serves to rock shaft 416 in the clockwise direction through a sufficient angle to release the application of brake 406 at the same time that microswitch arm 321 is operated to start the capstan motor 322. On the other hand, as slide plate 317 is retracted from the operating position shown in FIG. 15, microswitch arm 321 is released to deenergize the capstan motor, and finger 420 returns to its position in registration with notch 317*c* so as to allow tension spring 414 to drive shaft 416 in the counterclockwise direction while at the same time driving lever 407 in the clockwise direction to apply brake 405 to the periphery 401*a* of flywheel 401. Thus, the capstan of the capstan drive assembly 301 is rapidly brought to a stop as the slide plate 317 is retracted to the loading position.

FINE ADJUSTMENT FEATURE FOR THE HEAD INDEXING MECHANISM OF FIG. 13

The structure so far described with reference to FIGS. 11–13 may be considered as applied to the head indexing mechanism 337 of FIG. 10 as well as to the head indexing mechanism of FIG. 13 which specifically incorporates a fine adjustment feature. In particular, in the embodiment of FIG. 13, actuating knob 341 of FIG. 10 is replaced by a knob assembly 417 including a main adjustment knob 418 whose operation corresponds exactly to the operation of knob 341 in FIG. 10. The knob assembly 417 further includes a fine adjustment knob part 419 which in the embodiment of FIG. 13 is rotatable relative to the main knob part 418. Thus, if knob parts 418 and 419 were fixedly secured together, the embodiment of FIG. 13 would correspond essentially to the head indexing mechanism 337 of FIG. 10. That is, knob parts 418 and 419 could be replaced by the knob 341 in FIG. 13, and the disclosure of FIGS. 11–13 would then be applicable to the head indexing mechanism 337 shown in FIG. 10.

Referring to the fine adjustment feature of FIG. 13, it will first be observed that end bearing washer 420 is fixedly secured to the end of shaft 352 by means of screw 421 and serves to prevent axial displacement of fine adjustment knob 419 relative to shaft 352, while accommodating rotation of the fine adjustment knob 419 on the central vertical axis of the indexing mechanism. The fine adjustment knob 419 is provided with a cam follower protrusion 419*a* which is in engagement with a circular cam face 370*a* of sleeve 370. The slope of the cam face 370*a* is such that one revolution of knob 419 will shift sleeve 370 axially a distance of 0.0062 inch corresponding to the center to center spacing between adjacent tracks on the record medium being scanned by head 380. A compression spring is indicated at 422 for accommodating shifting of sleeve 370 and cam part 371 relative to the adjustment knob 419 in the axial or vertical direction. The sleeve 370 is provided with an internal keyway 370*b* which is in alignment with a keyway 360*a* of ratchet follower sleeve 360. A key is shown at 423 for locking members 360 and 370 for joint rotation while accommodating the required slight axial movement of member 370 and main knob 418 relative to member 360. Main knob 418 is secured with the cam sleeve 370 by means of set screw 424.

The position of the fine adjustment knob 419 in FIG. 13 may represent approximately a mid point in its range of adjustment. Thus, if knob 419 is rotated in the clockwise direction as viewed from the top, the follower 419*a* will travel along an upwardly sloping part of cam face 370*a*, forcing sleeve 370 and knob 418 downwardly against the action of compression spring 422. As cam part 371 integral with sleeve 370 is forced downwardly, edge face 371*a* of cam 371 will, of course, act on the following 390, FIGS. 11 and 12, moving the head slide 387 downwardly against the action of wire spring 393. On the other hand, if the fine adjustment knob 419 is rotated in the counterclockwise direction, follower 419*a* will travel along a downwardly sloping portion of cam face 370*a*, allowing spring 422 to raise sleeve 370 and knob 418, whereupon the wire spring 393 will correspondingly raise the head 380, FIG. 12. There is, of course, sufficient friction provided by means of the spring 422 so that the fine adjustment knob 419 will rotate with the main knob 418 whenever the main knob is manually grasped at its knurled surface 418*a* and rotated (in the clockwise direction) in indexing the head between successive channels manually. Since worm wheel 350 and ratchet member 355 are locked against rotation as long as the motor 330 is deenergized, main knob 418 can only be rotated in the clockwise direction permitted by the ratchet finger 361. The ratcheting action of finger 361 relative to teeth 356 provides a manual "feel" which enables the accurate manual indexing of the head to successive channels on the tape once the fine adjustment knob 419 has been accurately adjusted for a given tape. In any given position to which the knob 418 is rotated, a slight attempt to rotate knob 418 in the counterclockwise direction will insure that ratchet finger 361 is tightly engaged with the correct ratchet tooth 356 so as to estabalish the precise indexing position during manual channel selection.

As previously described, in the automatic mode of channel changing, the deenergized positions of the motor 330 are accurately determined by the notch 332*a*, FIG. 15A, of cam 331. The maximum variation in stopping position, of the cam 332 is less than the angular extent of notch 332*a*. Since notch 332*a* may have an extent equal to about 36°, for example, or about 10% of the channel to channel separation, the possible variation may be less than 0.0006 inch or less than 10% of the adjustment range provided by fine adjustment knob 419. Further in actual operation the stopping position of the motor 330 is consistent to within a degree or so, and as noted even the worst case of possible variataion corresponds to less than 0.06 mil, a variation which would not be noticeable in the picture produced by the head.

Preferably fine adjustment knob 419 has an established neutral position to which it is set for recording operation such as the mid position in its range of adjustment. A detent is shown in FIG. 13 for acting between knobs 418 and 419 to establish the desired neutral position. More specifically fine adjustment knob 419 is shown as having a spring urged detent ball 425, and knob 418 is shown as having a ball receiving depression 426 which serves to provide a manually discernible neutral position of knob 419 relative to knob 418.

Figure 6:
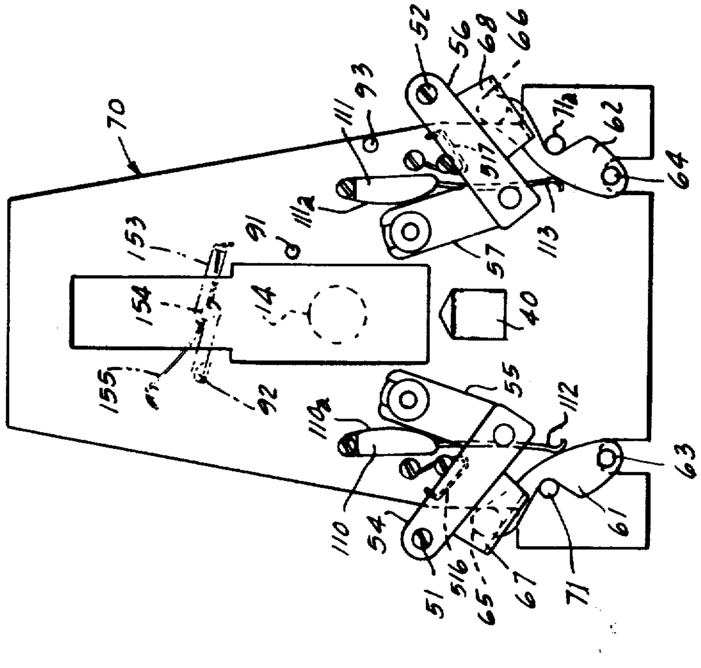
FIG. 6 (on sheet 3 of the drawings) is a somewhat diagrammatic view illustrating the internal operating parts fo the transport in the loading position thereof.

The manner in which the pressure rollers such as 323 are actuated a between the retracted position as shown in FIG. 14 and the operating position as shown in FIG. 15 can be understood from FIGS. 14 and 15, particularly when considered in conjunction with FIGS. 6 and 7 showing the previous embodiment which is essentially similar. To assist in correlating the showing of FIGS. 14 and 15 with the previous diagrammatic showing of FIGS. 6 and 7, the last two digits of the reference numerals applied to the actuating components for the pressure rollers in FIGS. 14 and 15 will correspond to the digits of the reference numerals designating such parts in FIGS. 6 and 7. In particular, cam arms 461 and 462 in FIGS. 14 and 15 are actuated by means of pins such as indicated at **471*a* carried by the shiftable plate 317 in a manner which is analogous to the operation of components 61, 62, 71 and 71*a* in FIGS. 6 and 7. Pivot points for the cam arms 461 and 462 are shown at 463 and 464 in FIG. 15. Further, a bracket is diagrammatically indicated at 467 in FIGS. 14 and 15 fixedly secured to linkage arm 324 and corresponding to the bracket 67 in FIGS. 6 and 7. As diagrammatically indicated in FIGS. 14 and 15, cam arm 461 carries a roller 465 at the free end thereof, which roller corresponds to roller 65 in FIGS. 6 and 7 and is confined between a side wall 467*a* of bracket 467 and an edge of linkage arm 324 so that as arm 461 is actuated in the clockwise direction by movement of side plate 317 to operating position, arm 324 is swung in a counterclockwise direction about its pivot 328 so as to occupy the position shown in FIG. 15. Similarly a roller 466 is mounted on the free end of cam arm 462 corresponding to the roller 66 in FIGS. 6 and 7. In FIGS. 14 and 15, linkage arms 326 and 327 and the pressure roller carried by arm 327 have been omitted so as to show the cooperation between arm 462 and other parts of the mechanism. In particular pivot arms 510 and 511 are shown in FIGS. 14 and 15 pivotally mounted on the slide plate 317 by means of pins 508 and 509, these pivot arms corresponding to pivot arms 110 and 111 in FIGS. 6 and 7. The pivot arms are provided with guide faces 510*a* and 511*a* for engagement with portions of the linkage arms 325 and 327 located below the respective pressure rollers such as 323. Wire springs 512 and 513 correspond to wire springs 112 and 113 in FIGS. 6 and 7, and are arranged so as to be actuated by the arms 461 and 462 at portions thereof just below the respective rollers 465 and 466 as specifically shown for the arm 462 and spring 513 in FIG. 15. Thus, as the carriage plate 317 is advanced to the operating position, pins such as 471*a* coact with cam surfaces such as 462*a* of cam arm 462 to pivot the cam arm 462 counterclockwise on its pivot 464. This, of course, moves the associated linkage arm 326 in a clockwise direction about its pivot 329, FIG. 10, in a manner analogous to the movement of linkage arm 324 in the counterclockwise direction about its pivot 328. As the linkage arms 324 and 326 are moved in the counterclockwise and clockwise directions respectively about their pivots 328 and 329, the portions of arms 325 and 327 coaxial with the pressure rollers ride on the guide faces 510*a* and 511*a*, FIG. 14, so as to cause the linkage arms 325 and 327 to pivot clockwise and counterclockwise respectively relative to the linkage arms 324 and 326. As the pressure rollers such as 323 approach the operating positions such as that indicated for roller 323 in FIG. 15, arms 461 and 462 begin exerting inward pressure on the respective wire springs 512 and 513 so as to tend to rotate pivot arm 510 in a counterclockwise direction about its pivot 508 and to tend to pivot arm 511 in a clockwise direction about its pivot 509, so that the pressure rollers such as 323 are pressed toward the capstan of capstan assembly 301** with the correct degree of pressure.

Conversely, as slide plate 317 is retracted from the operating position shown in FIG. 15, pins such as **471*a* are retracted so as to ride along the cam surfaces such as indicated 462*a*, FIG. 15, the wire springs 512 and 513 tending to urge the cam arms 461 and 462 in the counterclockwise and clockwise directions respectively as permitted by the pins such as 471*a*. The cam arms 461 and 462 are also urged toward their initial positions shown in FIG. 14 because of torsion coil springs (not shown) acting on the linkage arms 324 and 326. For example, the torsion spring acting on arm 324 has one end secured to base 602 adjacent pivot shaft 328 and the other end attached to arm 324, the spring being loaded so that it urges arm 324 to rotate in a clockwise direction about pivot 328. The other torsion spring associated with arm 326 is similarly arranged and is loaded so as to urge arm 326 to rotate in a counterclockwise direction. In FIGS. 1, 6 and 7, wire springs 516 and 517 are mounted on slide plate 70 so as to engage arms 54 and 56 as the slide plate is retracted from the operating position shown in FIG. 7, so as to rotate arms 54 and 56 from the position shown in FIG. 7 to the position shown in FIG. 6. The springs 516 and 517 are thus an alternative to the torsion coil springs actually used in FIGS. 10–17**.

Wire springs such as that indicated at 521, FIGS. 14 and 15, act on linkage arms 324–327 in such a way that the linkage arms 314–327 assume the "collapsed" configurations such as shown in FIG. 14 as slide plate 317 is retracted to the loading position. These wire springs such as 521 also insure that the pressure rollers such as 323 will be properly guided by means of the guide faces such as **510*a* as the slide is removed to the operating position. Similar wire springs are shown at 518 and 519 in FIGS. 1 and 3**.

As indicated for the linkage arm 324 in FIGS. 14 and 15, linkage arms 324 and 326 may be provided with flange strips such as indicated at 525. (Arms 324 and 326 are shown in FIG. 10 without flange strips, as in an earlier version of the present embodiment.) These flange strips serve to overlie the front edge of the cartridge in the operating position of the mechanism as shown in FIG. 15 so as to prevent any attempt to remove the cartridge prior to returning the mechanism to the load condition shown in FIG. 14.

CARTRIDGE FEATURE—FIG. 18

Figures 18, 19, 20, 21, 22:
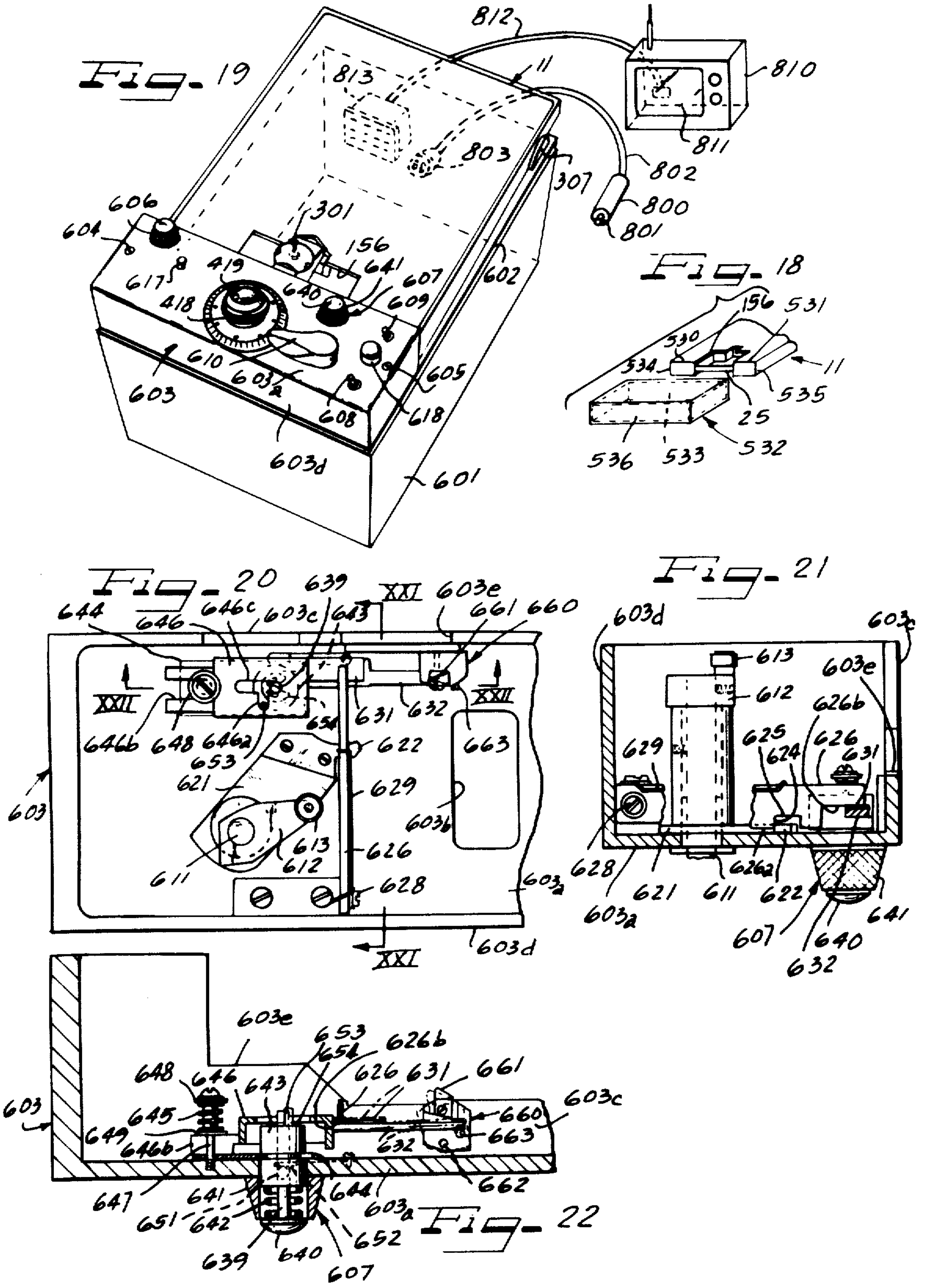
FIG. 18 (on sheet 6 of the drawings) is a somewhat diagrammatic fragmentary perspective view showing a cover for sliding engagement with the end of the cartridge of FIGS. 2 and 3, and applicable to any of the embodiments herein, for the purpose of completely enclosing the tape when not in use.
FIG. 19 is a somewhat diagrammatic perspective view showing a tape transport generally corresponding to that of FIGS. 10–17 but with a cover enclosing the operating components of the transport mechanism such as those shown in FIGS. 11–13,14 and 15.
FIG. 20 is a partial plan view of the cover assembly of the machine of FIG. 19, looking into the cover as detached from the remainder of the mechanism and inverted to reveal its internal parts.
FIG. 21 is somewhat diagrammatic transverse sectional view on a different scale and taken generally along the line XXI—XXI of FIG. 20.
FIG. 22 is a fragmentary enlarged longitudinal sectional view taken generally along the line XXII—XXII in FIG. 20.

FIG. 18 (on sheet 6 of the drawings) shows the cartridge for the embodiment of FIGS. 10–17, the cartridge being designated by the reference numeral 11 since it is identical to the cartridge of FIG. 2. As explain in refrence to the embodiment of FIGS. 1–9, the cartridge is provided with an aperture 29 for receiving the photocell 28 and an aperture 156 therein which serves to receive capstan drive assembly 301, as the cartridge is pivoted downwardly into the operating position after engagement with lugs 304 and 305, FIG. 14. The aperture 156 is further of a size to receive the capstan pressure rollers such as 323 which are advanced as indicated in FIG. 15 into the aperture 156 as slide 317 moves to the operating position. In the operating position, the strips such as indicated at 525 carried on the linkage arms 324 and 327 overlie regions such as indicated at 530 and 531 of cartridge 11 to prevent any attempt at removing the cartridge 11 from the machine so long as the machine remains in the operating position as shown in FIG. 15. When, however, slide plate 317 is retracted to the loading position, the strips such as 525 are pivoted about the pivot axes 328 and 329 respectively to positions such as shown in FIG. 14 where the strips are entriely clear of the cartridge 11 and of the tape path indicated at 25 at the front of the cartridge.

Once the cartridge 11 has been removed from the machine, a suitable cover such as indicated at 532 in FIG. 18 may be slipped over the front end of the cartridge so as to completely cover any apertures therein such as 29 and 156, FIG. 2, and thus render the cartridge dust proof and fully protect the tape at path section 25 of the cartridge. By way of example, the interior walls forming the left and right sides and top and bottom of the open space within the cover 532 may engage the corresponding faces of cartridge 11 such that the cover 532 is frictionally retained in assembly with the cartridge 11 against any inadvertent separation, but the frictional retaining forces being such that the cover 532 can be readily manually removed from the end of the cartridge 11 when it is desired to mount the cartridge in the machine. Thus, the open end 533 of cover 532 provides an opening with a cross section so as to relatively freely accommodate insertion of the end of cartridge 11. The edges of the cartridge such as indicated at 534 and 535 may be sufficiently rounded so as to facilitate insertion of the end of the cartridge into the opening 533. The top and bottom and side walls of cover 532 and end wall 536 are completely solid and free of apertures therethrough so as to provide an effective dust cover for the cartridge 11, which encloses and seals apertures 29 and 156, FIG. 2. The top and bottom edges of the cartridge 11 may also be sufficiently rounded so as to facilitate insertion of the cartridge into the open end 533 of the cover 532.

SUMMARY OF OPERATION (FIGS. 1—18)

Except as specifically mentioned herein, the structure and operation of the embodiment of FIGS. 1–9 corresponds to the structure and operation of the embodiment of FIGS. 10–18. The description and illustration of each embodiment is specifically applied with respect to the other embodiment except where differences are specifically noted or illustrated in the drawings. The following summary of operation will encompass both embodiments since the detailed showings of various features of the respective embodiments complement each other in providing a complete understanding of both.

The cartridge for both embodiments is illustrated in FIG. 2 and is so constructed that when removed from the transducer mechanism, a brake as indicated at 92 is applied to reel 120. Further, arms 132 and 133 are spring urged to the positions shown in FIG. 2 so as to define a straight tape path at 25 facilitating loading of the cartridge with the transport mechanism. A tape tension arm 143 is provided along the tape path for applying tension to the tape as the cartridge is unloaded from the transport mechanism. The tensioning arm 143 is urged in a clockwise direction about pivot point 144 by means of a wire spring as indicated at 540 so as to maintain the tape at path section 25 in a taut straight line condition.

In applying the cartridge 11 of FIG. 2 to the tape transport of FIG. 14, recesses at the underside of the cartridge are interengaged with the overhanging fingers 304*a* and 305*a* of lugs 304 and 305, with the cartridge disposed at an angle and overhanging the rear edge 302*a* of cartridge support 302. The interlock with the ledges 304*a* and 305*a* permits downward pivoting movement of the forward end of the cartridge to an operating position with the cartridge resting on the pads 309–312. Spring fingers 313 and 314 serve to urge the cartridge rearwardly so as to insure interengagement of the cartridge with the lugs 304 and 305 such that the rear edge of the cartridge cannot be lifted out of engagement with the lugs 304 and 305. As the cartridge is pivoted downwardly into the operating posititon, the tape path section 25, FIG. 2, moves between the capstan assembly 301 and the capstan pressure rollers such as indicated at 323, FIG. 14. The transducer head for the embodiment of FIGS. 10–18 is indicated at 380 in FIG. 12, and is disposed generally as indicated for head 40 in FIG. 1 in the loading condition of this transport mechanism.

With the cartridge in the operating position, carriage 317, FIG. 14, together with the head indexing assembly 337 and the head 380 are actuated to an operating position as represented in FIG. 15. In the operating position, the head 380 has its convex face as indicated at 380*a*, FIG. 12, inserted into a vertical groove as indicated at 202 in FIG. 5 of the tape guide 200. A detailed showing of the relationship between the pole pieces of the transducer head and the tape which extends along the channel 201 of tape guide 200, FIG. 5, is found in the second FIGURE of the copending application Ser. No. 60,806, the disclosure of which is incorporated herein by reference in its entirety with respect to each of the embodiments of the present disclosure.

As carriage 317 is advanced to the operating position shown in FIG. 15, capstan pressure rollers such as 323 are advanced so as to establish an operating loop path for the tape, with the tape pressed into driving engagement with the capstan at the periphery thereof such as indicated at 212 in FIGS. 1 and 8 at each of the opposite sides of the capstan.

In the operating position of the transport mechanism, a tape drag such as provided by components 94 and 96 in FIG. 3 acts at the incoming tape path. The tape drag is operable to apply a drag force to the tape which exceeds the momentum force on the tape at the outgoing tape path due to the inertia of reel 120 and the associated parts. By way of preferred example, the tape drag elements such as 94 and 96 in each embodiment apply a relatively substantial drag force which in conjunction with the capstan drive assembly provides a tape tension at the transducer head in a range from about 1 ounce to about 4 ounces for a ¼ inch wide magnetic tape.

In each embodiment, the incoming tape path such as indicated at 164 from the inner side of coil 128 to the incoming side of the capstan drive assembly follows a path having a total amount of bending of substantially less than 90°, and in fact less than 45°, so as to enable a relatively free movement of the tape. The constant friction supplied by the drag elements 94, 96 tends to swamp out any irregularities in tape motion, for example due to variations in the friction exerted by the coil 128 as the tape is unwound from the inner side thereof, and is found to be important in facilitating proper guiding of the tape over the pressure rolls, the capstan and the head during operation of the system.

The capstan drive rollers in each embodiment preferably have the configuration shown in the seventh figure of said copending application Ser. No. 60,806 for the purpose of establishing a substantial tension in the tape loop being scanned by the transducer head. For example, the groove in the capstan roller at the incoming side of the tape loop is wider than the tape and may have a depth of about 0.0015 inch, so that the tape engaging diameter of this capstan roller is about 0.003 inch less than that of the capstan roller at the outgoing side of the tape loop.

In each embodiment, the outgoing tape path section such as indicated at 165 in FIG. 3 has essentially zero tension but is sufficiently guided so as to pass in close proximity to the photocell assembly 28 or 303 which controls the successive vertical indexing movement of the transducer head. In the embodiment of FIGS. 1–9, each time the photocell assembly 28 is actuated, solenoid 41 is momentarily energized to index the ratchet wheel 43 through one increment of its movement, so as to shift the head 40 from the scanning of one channel longitudinally of the tape to the scanning of the next adjacent longitudinal channel.

In the embodiment of FIGS. 10–18, each actuation of the photocell assembly 303 serves to close an energizing circuit for motor 330. The motor rotates a drive train including worm 335 which in turn progressively moves the head 380 in a vertical direction by rotation of the cam 371, FIG. 11, having the cam face 371*a*. This motor energizing circuit is under the control of a switch operated by cam 332 which is included in the drive train, so that the motor 330 is deenergized at a precisely determined position of the head 380 corresponding to the next channel on the tape. The cam 332 is provided with a notch controlling opening of this electric switch, and the notch has a sufficient angular extent, for example 30°, so that the drive train will come to a stop while the cam actuating the switch is still in registry with the notch of the cam wheel 332, thus preventing the inherent momentum of the drive train from reclosing the switch and reenergizing the motor 330 when it is necessary that the motor come to a stop with head at the next channel to be scanned. The speed of the motor 330 and the reduction ratio of the drive train to the head is such that the vertical indexing movement of the head between successive channels takes place over an interval corresponding to a substantial distance of travel of the tape, the gradual transition between successive channels as scanned by the magnetic head being illustrated in the ninth figure of U.S. Pat. No. 2,857,164, the disclosure of this feature in U.S. Pat. No. 2,857,164 being incorporated herein by reference. An exemplary electric circuit is shown in FIG. 15A wherein the photocell circuit 303 may include a suitable monostable drive for electronic switch 542 such that each actuation of the photocell 303 maintains switch 542 conductive for a sufficient time interval to insure that motor 330 has driven cam 332 a sufficient angular distance so as to close contacts 543 and 544. The electronic switch 542 may also be a monostable circuit with an ON time such that the switch 542 will be non-conducting before notch 332*a* of cam 332 again comes into registry with follower 543*a*. Then, as soon as notch 332*a* again registers with follower 543*a*, the energizing circuit for motor 330 is opened and the drive train is brought to a stop in a position of the cam 332 such as indicated in FIG. 15A.

By way of example, the reflecting element on the tape that actuates photocell 28 or 303 may be 1¼ inches long in the direction of tape travel, giving a trigger pulse from photocell 303, FIG. 15A, lasting about 0.01 second, when the tape travels 120 inches per second. The electronic switch 542 may be a monostable multivibrator circuit which is actuated to the conductive state by the trigger pulse from photocell 303, and which remains conducting at least until notch 332*a* is out of register with follower 543*a* and switch contacts 543, 544 are closed. If the time to complete 1 revolution of cam 332 is 0.5 second, and if notch 332*a* has an extent of about 30°, the switch 542, once triggered, may remain closed a time interval corresponding to at least 30° of rotation of cam 332 or at least about 0.042 second. The electronic switch 542 must open in less than 0.5 second in this example so that the motor 330 will be deenergized when cam 332 has made a complete revolution. For a tape speed of 120 inches per second, the tape travels 60 inches during a channel changing interval of 0.5 second, giving a very gradual and unnoticeable transition. If a faster change is desired, the cam speed may be increased and the associated elements adjusted accordingly. If motor 330 and the gear train (331, 333, 334, 335 and 350) have a substantial lag in response to a trigger pulse from photocell 303, the electronic switch 542 is adjusted to provide a correspondingly longer ON time to compensate for the lag and insure reliable cycling of the motor 330.

Each of the illustrated embodiments is capable of operation at speeds of 120 inches per second, or more, and with scanning of a total of 40 channels on a ¼ inch wide tape without substantial cross talk.

In each of the embodiments, preferably the loop path extending from the incoming side of the capstan to the opposite outgoing side of the capstan has a length less than the capstan circumference, the transducer head being arranged for scanning cooperation with the record tape in such a way that the tape path conforms with the convex contour of the head as indicated at 380*a*, FIG. 12, but with an air space between the non-magnetizable backing of the tape and the bottom of the groove 202 such that the transducer head engages the record tape at an unbacked portion of the loop path. Alternatively a soft spongy pad may be secured in groove 202 and, for example, occupy the entire volume of the groove, so that the tape is resiliently backed in each scanning position of the head, the pad having a cover of smooth low friction material to facilitate indexing movement of the head relative thereto. As illustrated at 205 and 206 in FIG. 5, the tape guide channel may have a convex contour over an extent of the tape guide surface corresponding to a major portion of the loop path of the magnetic tape from the incoming side of the capstan to the outgoing side of the capstan.

When the transport mechanism is shifted back to the loading position for example as shown in FIG. 14, a microswitch finger 321 is released to deenergize the capstan drive motor, and operating finger 420 is released allowing spring 414, FIG. 16, to cause the application of the brake 405 to flywheel 401, and the reel brake as indicated at 92 in FIGS. 2 and 3 is released to allow spring 155, FIGS. 6 and 7, to exert a braking force on the reel. Preferably where the reel has substantial angular momentum, the drag provided by elements such as 94 and 96 is released as the carriage 317 is retracted to the loading position so that movement of the tape is brought to a stop by means of the reel brake 92 at the same time that the capstan is being stopped by means of the capstan brake 405, FIG. 16. Preferably, the tape drag is substantially released approximately simultaneously with the release of driving engagement between the capstan and the tape. Thus, the drag force on the tape is released generally contemporaneously with the release of engagement between the capstan and the pressure rollers. Preferably, the capstan flywheel brake is operable to essentially stop the capstan during the minimum time required to remove and replace a cartridge relative to the support, so that there would be no possibility of the capstan continuing to rotate at the time a new tape is engaged therewith. Most preferably, the capstan brake operates with sufficient speed so that the capstan will stop rotating in approximately the time required for the reel brake 92 to stop the movement of the magnetic tape, so that tape of the cartridge can be re-engaged with the capstan at any substantial time subsequent to the actuation of the transport mechanism to the loading position after a playing operation.

Once the transport mechanism has been retracted to the loading position, the cartridge 11 may be pivoted upwardly about the lugs 304 and 305, FIG. 14, so as to remove the cartridge from the machine. An ejector (not shown) actuated by a push button can lift the cartridge at the forward edge (against the resistance provided by spring fingers 34, 35, FIG. 3, or 313, 314, FIGS. 14 and 15) to allow easy access to the cartridge. Spring fingers 34, 35, 313, 314 would serve to retain the cartridge in the position to which it was raised by actuation of the ejector. A cover 532 may be applied over the open end of the cartridge 11 as shown in FIG. 18 so as to provide a dust proof enclosure for the magnetic tape when the cartridge is not in use.

EMBODIMENT OF FIGS. 19-26

Referring to FIGS. 19–26 there are illustrated further features which may be applied to any of the preceding embodiments for the purpose of facilitating manual shifting of the carriage 70 or 317 from the load to the operating position, for the purpose of automatically returning the carriage to the load position after completion of scanning of all of the channels of a tape, where desired, and for the provision of other advantageous control features. In FIG. 19, the same reference numerals have been applied to the cartridge as were applied with reference to FIG. 18, since the cartridge is illustrated as being identical for each of the embodiments herein. For the purpose of the present description, the embodiment of FIGS. 19–26 will be correlated with certain features and structure of the embodiment of FIGS. 10–17, but it will be apparent that corresponding functions and structure are applicable to the embodiment of FIGS. 1–9, and the application of the following description to the embodiment of FIGS. 1–9 is to be understood as specifically being included herein, the reference numerals of the embodiment of FIGS. 1–9 being substituted for the reference numerals referring to FIGS. 10–17 in the following description for this purpose.

FIG. 19 shows a box-like housing 601 for supporting a base plate 602 and for enclosing the portions of the transport apparatus below the base plate such as motor 322, FIG. 10. In the illustrated embodiment base plate 602 supports the pads 309–312 and thus may be considered as part of the cartridge support 302 previously referred to.

Referring to FIG. 19, a box-like cover 603 is shown which is fastened by means of screws 604 and 605. The side of cover 603 adjoining the capstan drive assembly 301 is, of course, sufficiently open to accommodate the projection of the capstan pressure rollers to the positions such as shown for roller 323 in FIG. 15. The horizontal upper wall of cover 603 is indicated at 603*a* in FIGS. 11 and 13 and is provided with an elongated aperture as indicated at 603*b* (FIG. 20) through which portions of the head indexing assembly project. (FIG. 11 shows the head indexing assembly advanced to the operating position relative to aperture 603*b*, that is with head 380, FIG. 12, projecting through opening 603*e*, FIGS. 20 and 22, of cover wall 603*c*). Thus, main adjustment knob 418 and fine adjustment knob 419 are accessible at the outer side of the cover 603 for convenient manipulation. Also accessible external of the cover 603 are a carriage control lever 610, a record-play control knob 606, a manual-automatic control knob 607, an on-off toggle switch 608 and a repeat-continuous play toggle switch 609. Lamp 618 may be illuminated when the toggle switch 608 is in the ON position. Where the embodiment of FIG. 19 includes the record control feature of FIGS. 23–26, a record control button 617 is also present. FIG. 15A shows contact 609*a* controlled by toggle switch 609 for selectively activating or disabling the automatic head indexing circuit.

The carriage control lever 610 is fixed to a shaft 611, FIG. 20, carrying an operating crank 612 and a roller 613. When the cover 603 is in place on the machine, roller 613 is engaged in slot 614, FIGS. 10, 14 and 15 in a bracket 615 which is fixedly secured to carriage 317. Thus, when lever 610, FIG. 19, is rotated in a clockwise direction as viewed in FIG. 19, crank 612 is rotated counterclockwise as viewed in FIG. 20, moving roller 613 toward the rear wall 603*c* and away from the front wall 603*d* of cover 603. This movement of roller 613, of course, moves carriage 317 rearwardly to its operating position by virtue of the engagement of roller 613 with slot 614 of bracket 615. As the carriage is advanced, the capstan pressure rollers project through the aperture indicated at 603*e*, FIGS. 20 and 21, and the transport is automatically set in motion as previously described (providing switch 608 is in the ON position).

A tension spring 619, FIGS. 14 and 15, has one end secured to pin 318, FIGS. 14 and 15, for example, and the other end secured to a fixed point of the transport adjacent capstan assembly 301 so that the tension spring resists the movement of the carriage 317 to the operating position. A similar tension spring may, of course, be provided for carriage 70, FIG. 1–9.

Fixedly secured to shaft 611 (FIG. 20) for rotation therewith is a latching plate 621 carrying a latch finger 622 which is adapted to lock the operating lever 610 in the operating position shown in FIG. 20 and corresponding to the operating position of the carriage shown in FIG. 15. More specifically as shown in FIG. 21, finger 622 is adapted to interlock with a shoulder 624 of a notch 625 in latching bar 626. Thus the interengagement of the shoulder 624 with latching finger 622 serves to retain the carriage 317 in the desired operating position shown in FIG. 15 against the action of the carriage return spring previously referred to. The latch bar 626 is pivotally mounted at 628 and is provided with a wire spring 629 urging the bar to pivot downwardly or clockwise as viewed in FIG. 21. Thus, as the operating lever 610 is moved in the clockwise direction as viewed in FIG. 19, latching plate 621 moves in a counterclockwise direction toward the position shown in FIG. 20, and the latch finger 622 rides along the undersurface 626*a* of latch bar 626. As soon as the finger 622 moves beyond the shoulder 624, spring 629 causes latch bar 626 to pivot downwardly to the position shown in FIG. 21 with edge 626*b* resting on a shim 631 carried by a release bar 632.

The manual-automatic control 607 is provided with a carriage return button 640 which is reciprocally carried within the main knob portion 641 of control 607 and is spring urged by means of compression spring 642, FIG. 22, away from the top cover panel 603*a*. When the button 640 is depressed against the action of the spring 642, shaft 639 of control 607 is actuated to shift release bar 632 against the action of compression spring 645. This operation of button 640 serves to displace release bar 632 and shim 631 in the direction away from cover 603*a* so as to pivot latching bar 626 in the counterclockwise direction as viewed in FIG. 21 to release the latching plate 621. The return spring acting on the carriage 317 will thus return the carriage to the loading position shown in FIG. 14 whenever the button 640 is depressed.

The main knob portion 641 has two angular positions as established by a detent ball 651 urged by means of a leaf spring 652 against the undersurface of knob part 641. The knob 641 is provided with two ball receiving depressions which depressions are aligned with the ball 651 in the respective manual and automatic positions of knob part 641. Secured with the knob part 641 is a sleeve 643 which is held within an aperture in cover panel 603*a* by means of a retainer strip 644. In particular the sleeve has an annular groove at the level of the retainer strip 644 and the strip 644 has a semi-circular notch at the free end thereof which receives the grooved part of the sleeve so as to prevent axial shifting of the sleeve 643 while accommodating rotation of the sleeve 643 with the knob part 641. The sleeve 643 carries a pin 653 which operates in a slot 646*a* of a plate 646. The plate 646 is secured with the release bar 632 and is guided for reciprocal movement by means of a slot 646*b* which cooperates with a fixed guide pin 647. The guide pin has compression spring 645 acting between a washer 648 and a washer 649 which has a larger diameter than the width of the slot 646*b*. Thus, the compression spring 645 tends to press the slotted part 646*b* downwardly against the strip 644 while allowing reciprocal movement of the plate 646 and release bar 632 in response to rotation of knob part 641.

The release button 640 is secured with shaft 639 which is reciprocally movable within the sleeve 643. The shaft 639 carries a washer 654 at the end thereof which has a diameter larger than the width of slot 646*c* so that when the button 640 is depressed against the action of spring 642, the washer 654 acts on the plate 646 so as to raise the same against the action of the compression spring 645. The amount of travel of the washer 654 is sufficient in either position of the knob 641 to raise the latch bar 626 and release latch finger 622 from its engagement in notch 625.

When knob 641 is rotated clockwise as viewed in FIG. 19, pin 653 travels counterclockwise as viewed in FIG. 20 so as to shift release bar 632 and plate 646 to the right as seen in FIG. 20, the end of shaft 639 riding longitudinally in the slot 646*c* as the plate 646 moves to the right. This movement corresponds to actuation of control 607 from the manual to the automatic position, the automatic position of plate 646 and release bar 632 being shown in FIG. 22.

In the automatic position of the mechanism as shown in FIG. 22, the carriage 317 is to be automatically returned to the load position whenever the head assembly including mounting bracket 381, FIG. 11, returns to the uppermost position, in readiness for scanning channel number one on the tape. In particular, release bar 632 in the automatic position is arranged to cooperate with a release lug 660 which has an abutment 661 disposed for engagement with the head bracket 381 as the bracket returns to the uppermost position. The automatic release lug 660 is pivotally mounted at 662 and is provided with a pin 663 which is arranged to shift the release bar 632 away from panel 603*a* when abutment 661 is engaged by the head assembly to rotate lug 660 in the counterclockwise direction as viewed in FIG. 22. The displacement of the release bar 632 away from the cover panel 603*a* as a result of this rotation of lug 660 is sufficient to release latch finger 622 from notch 625.

With the illustrated embodiment, control 607 must be shifted to the manual position in order to permit latching of the parts 622 and 624, FIG. 21, while the head is in scanning relation to channel number one on the tape. Once the head has scanned the first few channels, however, the control 607 may be placed in automatic position if it is desired to stop after scanning of the last channel. Of course, abutment 661 could be momentarily actuated just in advance of the head reaching its initial indexing position in each revolution of cam 371, for example by means of a finger rotatable with cam 371, so that abutment 661 would return to its normal position shown in solid outline in FIG. 22, as the head is shifted to the initial indexing position. In this case, control 607 could remain in the automatic position, if desired, as a new scanning operation is initiated since latch 622, 624, FIG. 21, would be operative with the head in its initial indexing position. In any case, if control 607 is left in the manual position, corresponding to the position of parts shown in FIG. 20, pin 663 is clear of the end of release bar 632, so that even though lug 660 is actuated as (or just before) the head returns to channel number one, the release bar remains in the normal position shown in solid outline in FIG. 22, and the transducing operation continues without interruption. Thus by leaving control 607 in the manual position the successive channels will be scanned repeatedly until button 640 is actuated to release the latch 622, 624.

Figure 23:
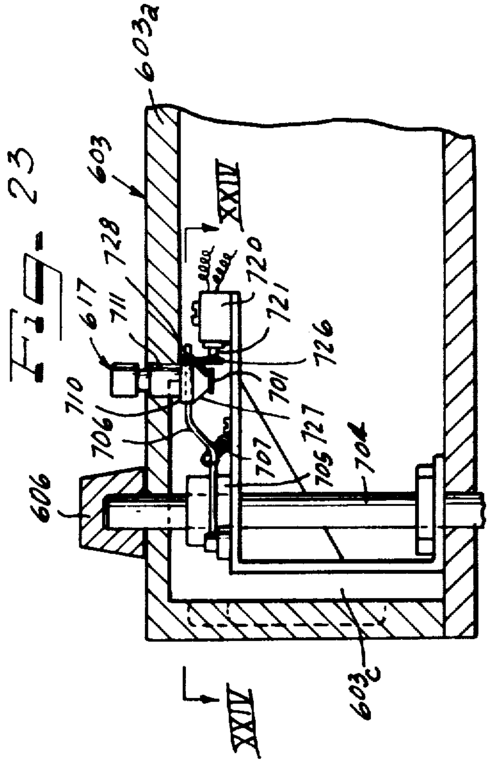
FIG. 23 is a somewhat diagrammatic enlarged fragmentary vertical sectional view illustrating details of a a preferred record-play control mechanism which is preferably associated with the cover of the machine of FIG. 19.
Figure 24:
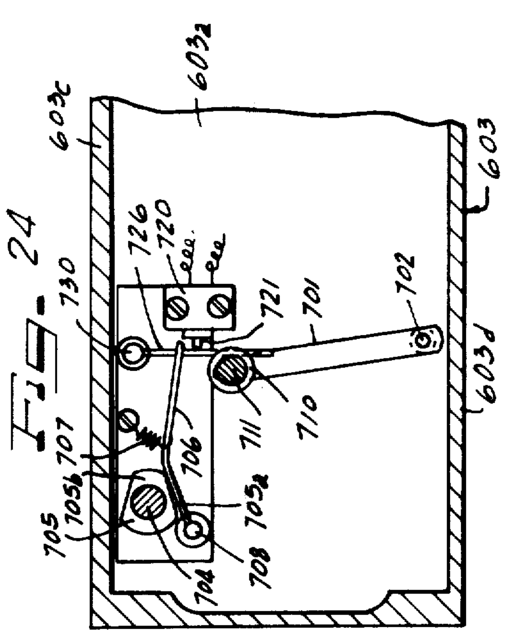
FIG. 24 is a somewhat diagrammatic partial horizontal sectional view taken generally along the line XXIV—XXIV of FIG. 23 and illustrating the condition of the parts in the playback mode.

Referring to FIGS. 23–26, cover 603 is shown in an upright orientation. FIGS. 23 and 24 show the record-playback control 606 in the playback position with record button 617 maintained in an upper (non-depressed) position by means of a leaf spring 701 which may be secured to cover panel 603*a* as indicated at 702. The control knob 606 is shown as secured to a rotary shaft 704 carrying a cam actuator 705. In the playback position as shown in FIG. 24 actuator 705 has a flattened portion 705*a* registered with spring wire 706 so that tension spring 707 maintains the wire 706 in an extreme counterclockwise position relative to its pivot 708. As seen in FIG. 24, in this position of the wire 706, the wire is clear of shoulder or ledge 710 on the shank 711 associated with record button 617, so that even if the button is momentarily depressed, the button will not be latched in the depressed condition. Where desired, button 617 could be blocked to prevent movement thereof in the play position of control 606, thus preventing actuation of switch 720 in such play mode. See Camras U.S. Pat. No. 2,761,017, the fourth figure as showing an arrangement for blocking movement in one position of a record/play control.

By way of example, the transducer system of the present invention may be utilized with the electric circuits such as shown in the fifth figure of the copending Camras application Ser. No. 831,352 filed June 9, 1969 (now U.S. Pat. No. 3,686,433 issued Aug. 22, 1972), or in the first or second figures of Camras application Ser. No. 156,287 filed June 24, 1971.

By way of example, if the present invention is utilized with the fifth figure of application Ser. No. 831,352, when utilized in the video mode, shaft 704 would be coupled for controlling actuation of switches (84), (85), (126) through (128), referring to the reference numerals used in application Ser. No. 831,352, while switch 720 would control contacts (125, and (129) of this prior application. In this event, contacts (125) and (129) of switch 720 would be spring urged to the playback position, with switch operator 721 fully projected from the switch as shown in FIG. 23. Switch 720 would be actuated to the record position by depressing button 617 to the position shown in FIG. 25. Thus, since contact (125) controls application of power to the bias oscillator, and contact (129) controls the supply of signal to the head, actual recording operation would be prevented even with control 606 in the record position, until such time as button 617 is depressed to the position shown in FIG. 25. With the control 606 in the record position, however, an incoming signal as received by a broadcast television receiver, for example, would be supplied via contact (127) to the video display unit of the television receiver, so that the operator could view the incoming signal without applying bias frequency and signal to the recording head. As an alternative, control 606 can be coupled with all switches (84), (85), and (125) through (129) in the fifth figure of application Ser. No. 831,352, and switch 720 would operate contacts controlling continuity in the conductor leading from the bias frequency secondary winding to contact (84) in said fifth figure. Thus switch 720 would require only one set of contacts and inadvertent closure of switch 720 during play mode would only interrupt the playback signal and could not harm the signal recorded on the record tape. With separate record and play heads as in application Ser. No. 156,287, the playback signal would not be interrupted by inadvertent actuation of switch 720.

Similarly for the embodiment of the second figure of Ser. No. 156,287, shaft 704 of the record-play control 606 could control the position of contacts (205) and (215) in the second figure of Ser. No. 156,287, while contacts of switch 720 could control continuity in the circuit connecting bias secondary winding (2–44) with the head winding (2–49) so that the head (2–50) would be deenergized until such time as button 617 is depressed. In each instance, switch 720 may control the application of signal and bias to the recording head and also control the application of erase current to the erase head so that even if the transport is in operating mode with the tape running across the heads, no recording or erasing operation would take place until such time as button 617 was depressed with selector control 606 in the record position. As another example, control shaft 704 could control all of the record-play switch contacts in the sixth figure of u.S. Pat. No. 3,596,008 for each of the X, Y, and Z circuits, while switch 720 could include normally open contacts controlling the supply of signal and bias to the record head units and the supply of erasing current to any erase head or head unit.

Figure 25:
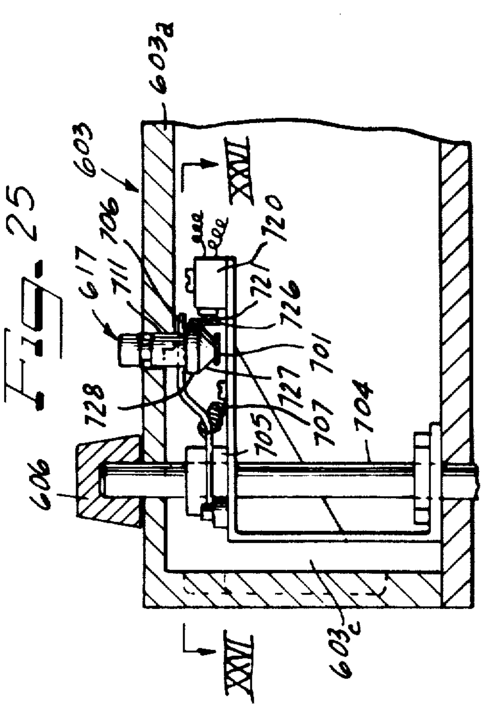
FIG. 25 is a view similar to FIG. 23 but showing the condition of the parts in record mode.
Figure 26:
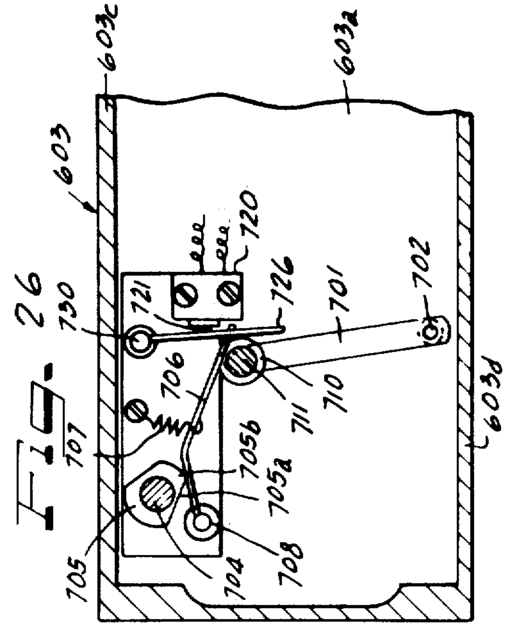
FIG. 26 is a horizontal sectional view taken generally along the line of XXVI—XXVI of FIG. 25.

The manner in which the switch 720 is operated can be understood from a comparison of FIGS. 23 and 25. Specifically, switch actuator 721 is engaged by means of a follower strip 726 having its upper edge engageable with a frusto conical surface 727 of button 617. Thus, as button 617 is depressed, follower strip 726 is shifted to the right as viewed in FIG. 23, and is held in the actuating condition as shown in FIG. 25 by means of a constant diameter portion 728 of button 617. As shown in FIGS. 24 and 26, follower strip 726 may be carried on a fixed post 730 where the strip 726 has sufficient flexibility, or may be mounted pivotally at 730 as a second alternative.

With selector 606 in the record mode, portion 705*b* of actuator 705 acts on wire 706 so as to urge the same against the constant diameter portion 728. Thus, when the button 617 is depressed, wire 706 springs into overlying relation to flange or ledge 710 so as to retain button 617 in the depressed condition against the action of the leaf spring 701. Once button 617 has been depressed, the record mode can be discontinued by actuating control 606 to the playback position. Whenever control 606 is moved to the playback position, button 617 returns to its upper position, and recording can only be resumed by again actuating button 617 with control 606 returned to the record position. Thus, button 617 can serve as a safety device to insure that recording mode is established intentionally, and not simply by the position of selector 606. Further, selector 606 can be placed in the record mode to monitor an incoming signal without actually energizing the recording and erase heads, for example.

REMOTE CHANNEL SWITCHING FEATURE-FIG. 19

FIG. 19 shows a remote switch 800 for simulating the operation of photocell 303, FIG. 15A, so an operator by depressing button 801 may actuate the head indexing mechanism so as to cause the head to move into scanning relation to the next succeeding channel. The remote switch 800 is of a size to be held in the hand in such a position that button 801 can be momentarily depressed against the action of a bias spring by means of the thumb. The contacts of the switch operated by button 801 are connected by means of a pair of conductors within a flexible cable 802 to respective terminals of a plug 803. The plug 803 is detachably connectable with a suitable socket indicated at 804 which may be located at the rear of housing 601. By way of example, socket 804 has been shown in the electric circuit of FIG. 15A at the input to transistor switch 542. When button 801 is momentarily depressed to close the contacts of switch 800, FIG. 19, this completes an electric circuit between the two terminals of socket 804 so as to provide a closed circuit shunting the input conductors to transistor switch 542. Thus, each time button 801 of switch 800 is actuated, transistor switch 542 becomes conducting to provide a closed electric circuit between D.C. source 805 and motor 330, with the same essential operation as for the case where photocell circuit 303 is actuated. Thus, the electronic switch 542 may be a monostable circuit with an ON time of a sufficient time interval to insure that motor 330 has driven cam 332 a sufficient angular distance so as to close contacts 543 and 544, but the ON time being less than the time required for notch 332*a* to again register with follower 543*a*. If the time to complete one revolution of cam 332 is 0.5 second, either button 801 must be released in less than 0.5 second, or the switch contacts actuated by button 801 must be of a momentary operate type so as to maintain the closed condition for less than 0.5 second (and for more than 0.01 second, for example) for each depression of button 801, regardless of how long button 801 remains depressed. While the circuit of FIG. 15A involves a brief interval of time for shifting of the head from one channel to the next, the remote switch 800 may also be associated with a head indexing mechanism such as indicated in FIG. 3 wherein the transistor switch 542 would be arranged to close an energizing circuit for solenoid 41, in which case each momentary actuation of button 801 would immediately cause the head to assume scanning relation to the next successive channel.

Also shown in FIG. 19 is a conventional broadcast television receiving set 810 having a viewing screen 811. A flexible cable is indicated at 812 for conveying video signals as reproduced from the cartridge 11 to the television set 810 for display on the screen 811. The cable 812 is shown as being provided with a connector 813 having detachable connection with a cooperating connector secured to the housing 601. The cable 812 may contain conductors such as those designated by reference numerals (110), (111) and (112) of the first figure of U.S. Pat. No. 3,596,008 dated July 27, 1971.

The push button 801, FIG. 19, allows rapid selection or rejection of the programming while one is watching the picture on screen 811 from a convenient viewing distance. It is especially advantageous when the selector switch 609 of FIG. 19 (which controls contact 609*a*, FIG. 15A) is in the repeat position. In this case an individual channel of the recorded program is displayed on the screen 811 until button 801 is pressed to show the next channel. Such operation is useful for educational applications and for lectures and demonstrations.

ALTERNATIVE SYSTEM USING A TAPE BELT CONFIGURATION

The amount of tape in the continuous loop being scanned by the system of FIG. 19 can be quite small, so that the push button 801 then serves to select a series of animated "slides" (each channel representing a time sequence of frames, for example). The tape loop can be formed as a short belt by directly connecting tape sections 164 and 165 in FIG. 3 and omitting coil 128. A convenient length for such a short endless tape loop or belt, for example, is 8.00 inches, (corresponding to a circular loop with a diameter of approximately 2.55 inches).

The short tape loop, or belt, may be used without a cartridge, or with a full size cartridge, but is preferably contained in a small size cartridge or adapter that serves to retain the loop for automatic threading about the capstan drive assembly 14 as the cartridge is placed on the machine; or with an adapter already on the machine, the tape loop only can be exchanged for another. By way of example, tape clamping elements such as 94 and 96 within the adapter may hold the tape belt in threading position when the adapter is removed from the transport. The drag elements corresponding to 94 and 96 can remain in engaged relation to the tape belt at all times and do not need to be released as the capstan pressure rollers are retracted from the adapter to stop a play operation.

The tape belt preferably has a circumference or length which is a multiple of tape velocity divided by frame rate. For a tape velocity of 120 inches per second and a frame rate of 30 frames per second, the circumference of the tape belt is a multiple of 4 inches. A four inch circumference then has one recorded frame consisting of two interlaced fields in the American Standard television system. An eight inch circumference belt has two frames recorded between a 12 inch circumference, three frames and so on. A 2 inch circumference belt may be used as a minimum at the above tape velocity and frame rate, to provide a single recorded field, thus sacrificing the advantage of interlacing. Similarly, belt circumferences equal to odd multiples of tape velocity divided by field rate may be used.

The belt length and the recording on it should be adjusted accurately to prevent a discontinuity at the end of each scanning cycle. When a splice is used it should preferably occur during the vertical blanking interval.

The tape belts may be carried in mini cartridges containing the tape loop and tape drag elements in an inexpensive plastic enclosure that fits onto the transport mechanism just behind the capstan drive assembly. The front part of the tape loop may be manually pulled from the cartridge and placed about the capstan drive assembly piror to advancing the capstan pressure rollers.

HEAD ASSEMBLY FOR TRANSDUCING COLOR VIDEO SIGNALS

For the case of color video signals, the head configuration may conform to the teachings of U.S. Pat. No. 3,502,795 with a spacing between successive ones of three head units of 12 indexing distances, and the cable 812 may contain the conductors connecting part A and part B of the sixth figure of said U.S. Pat. No. 3,596,008.

For purposes of illustration of the belt type cartridge, FIG. 2 shows a suitable cartridge where the tape section adjacent pivot 144 connects directly with the tape section leading into clamp parts 94, 96. Preferably, however, the tape would extend about the hub of the reel and then across guide 130 insuring the capacity for operation at 120 inches per second.

Camras application Ser. No. 62,601, now U.S. Pat. No. 3,683,107 issued Aug. 8, 1972 shows in the twelfth through nineteenth figures various arrangements for recording color video and sound on one, two or three channels. With two head units in head 40, for two channel color video recording and playback the head units may be spaced twenty indexing distances, the tape having a total of forty tracks and the head indexing cam 371 being modified to provide 20 indexing steps in a complete cycle and to move the head a total of about ⅛ inch instead of about ¼ inch.

As another example, a head assembly as shown in the eleventh figure of said U.S. Pat. No. 3,683,107 may be carried on bracket 381, the indexing parts (477), (478) being omitted so that only knob (499) moves the head relative to bracket 381. Further the head assembly may have two head units with a center to center spacing equal to three times the channel width (which channel width may be 1/160 inch). The indexing distance may be twice the channel width to record color video and sound on 38 of the channels. The recording and playback circuitry may conform with the 16th and 17th figures of said U.S. Pat. No. 3,683,107, for example.

The features just described with reference to FIG. 19 are hereby also specifically applied to each of the other embodiments disclosed herein.

DETAILS OF THE CARTRIDGE-FIGS. 27–30

Figure 27:
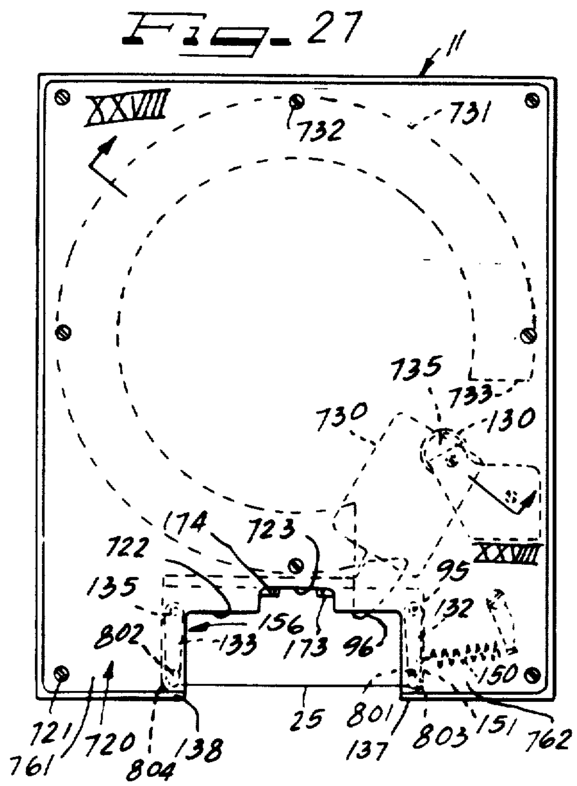
FIG. 27 is a somewhat diagrammatic plan view of the cartridge of FIG. 2, with the top cover in place.
Figure 28:
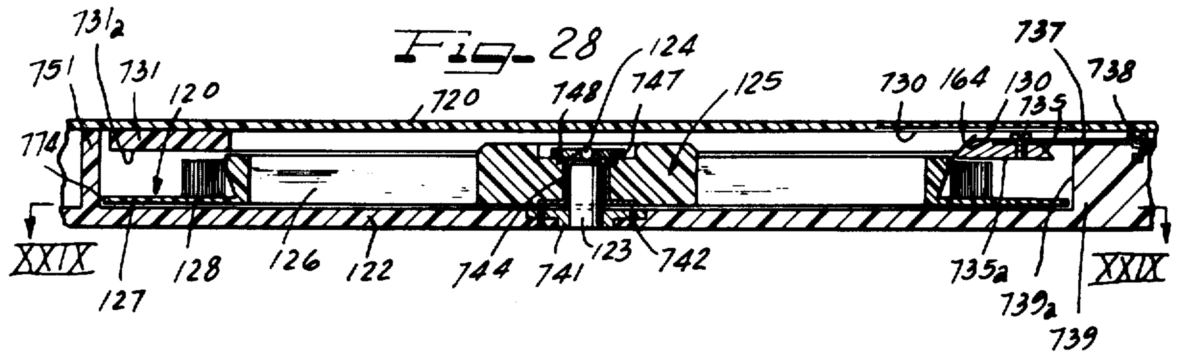
FIG. 28 is a vertical sectional view of the cartridge, taken generally along the line XXVIII—XXVIII of FIG. 27.

FIGS. 27–30 show further details of construction of the cartridge 11, the cartridge being illustrated in FIG. 27 in top plan view with cover 720 in place, while FIG. 2 shows the same cartridge with the cover 720 removed. In the illustrated embodiment, the cover 720 is a flat plate of generally rectangular configuration and removably secured to the remainder of the cartridge by means of screws such as indicated at 721. The cover 720 is provided with a cut-out portion at 722 conforming with the contour of aperture 156 so as to receive the capstan drive assembly 14 within the tape loop 25 as the cartridge is loaded onto the transport mechanism. The cover 720 is also provided with a notch 723 adjoining cut-out 722 so as to accommodate rollers 171 and 172, FIG. 1, or the corresponding roller 725 and 726, FIG. 15, in the operating position of the cartridge 11 on the transport mechanism. The illustrated cover is further provided with an interior opening recess 730 which provides additional clearance for the portion of the tape path indicated at 164 in FIGS. 2 and 28. Also present in the illustrated embodiment is a ring segment 731 secured at the inner side of the cover 720 by means of screws such as indicated at 732. The ring 731 is made of a plastic material or the like having a smooth undersurface **731*a*, FIG. 28, which is disposed in close conforming relation to the coil 128 so as to prevent escape of the coil 128 even when the cartridge is inverted. The ring 731 has a gap as indicated at 733 in the region of the incoming tape path section 164 which is best seen in FIG. 2. The tape at this section departs from the inner side of coil 128 and passes upwardly and in sliding relation to guide surface 130 of a guide element 735. As shown in FIG. 28, element 735 is provided with a smooth under surface 735*a* which extends in overlying relation to the upper edges of the tape at coil 128, thus serving to retain the tape coil at the region of gap 733 in the ring 731. The element 735 is shown as being fixedly mounted by means of a plate 737 secured by means of a screw 738 to a wall part 739 of cartridge 11.**

Figure 29:
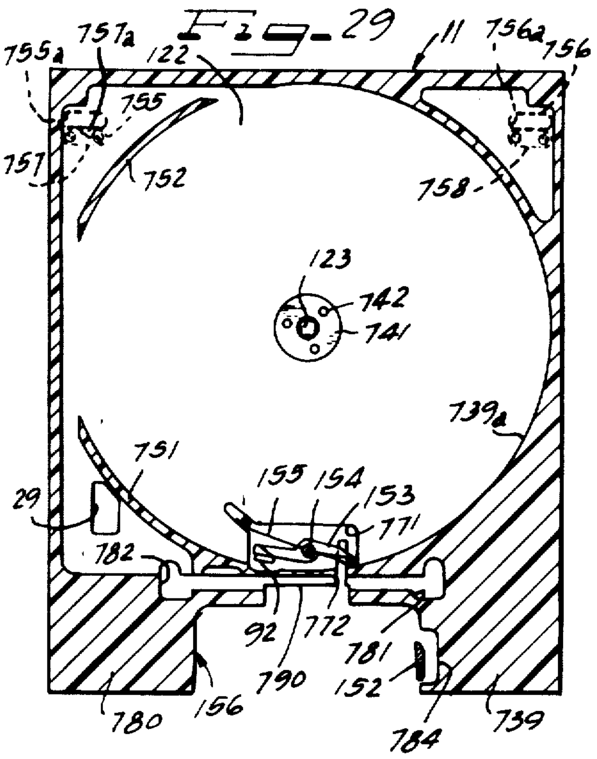
FIG. 29 is a horizontal sectional view, taken generally along the line XXIX—XXIX of FIG. 28.

FIG. 28 also shows details of the bearing assembly for reel 120, the base plate 122 having bushing 741 secured thereto by means of screws 742 and fixedly mounting post 123. The hub 125 includes a liner 744 of cylindrical configuration and in close fitting relation to the external cylindrical surface of post 123 so as to maintain the reel 120 in the desired orientation while freely accommodating rotation thereof. Seat member 747 is secured to hub portion 125 by means of screws such as 748 and provides an interior conically shaped seat supported by ball 124. As seen in FIGS. 28 and 29, wall portion 739 provides a generally segmental cylindrical interior face **739*a* conforming with the circular contour of flange 127 of reel 120. Further internal wall portions 751 and 752 also serve to confine the tape to the desired path within the cartridge, this path being best illustrated in FIG. 2.**

As seen in FIG. 29, the bottom wall 122 of the cartridge is provided with recesses 755 and 756 which open at the under side of the cartridge but preferably do not open into the interior of the cartridge. The forward portions of recesses 755 and 756 are covered by metal strips 757 and 758 so as to provide ledges such as indicated at **757*a* which are spaced below the cartridge bottom wall at the region of recesses 755 and 756. In FIG. 29, the cartridge bottom wall has been partly broken away where it overlies the strip 757 so as to show the ledge 757*a* which interlocks the fingers such as illustrated at 304*a* and 305*a* in FIG. 14. In loading the cartridge onto the transport mechanism such as indicated in FIG. 14, portions 755*a* and 756*a* of recesses 755 and 756, FIG. 29, receive lugs 304 and 305 with overhanging finger portions 304*a* and 305*a* displaced rearwardly relative to the strips 757 and 758. The cartridge is then pressed rearwardly so that fingers 304*a* and 305*a* overhang ledges such as 757*a* of strips 757 and 758 as the cartridge is pivoted downwardly into the operating position. As previously explained, spring fingers such as 313 and 314 in FIG. 14 bias the cartridge rearwardly so as to maintain interengagement between the fingers 304*a* and 305*a* and the ledges provided by strips 757 and 758. Further, with the transport in the operating position as shown in FIG. 15, flanges such as indicated at 525 in FIG. 15 overlie regions such as indicated at 761 and 762 (FIG. 27**) of the cartridge so as to prevent removal of the cartridge from the transport mechanism when the transport mechanism is in the operating position.

Also shown in FIG. 29 is recess 771 in bottom wall 122 which opens interiorly of the cartridge and is of a depth to mount reel brake arm 153 below the level of flange 127 of reel 120. A notch 772 is formed in the bottom wall 122 so as to accommodate movement of pin 91, FIGS. 6 and 7, or pin 773, FIGS. 14 and 15, into engagement with arm 153 in the operating position of the transport mechanism. As previously described, this serves to release brake pad 92 from engagement with the rim 774 of flange 127.

Figure 30:
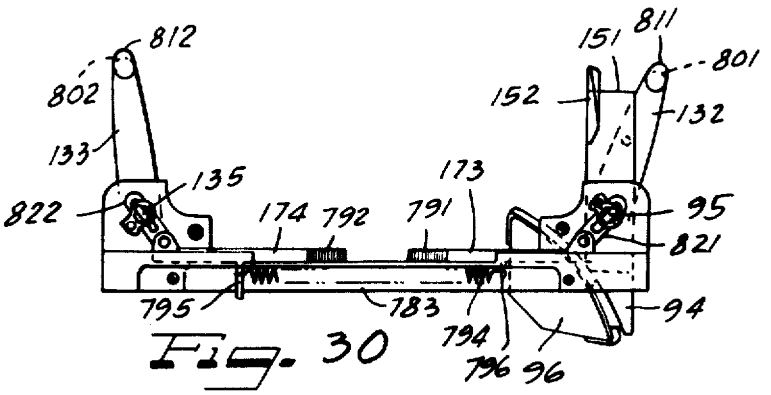
FIG. 30 is a somewhat diagrammatic enlarged bottom plan view of a tape support subassembly removed from the cartridge and showing the tape guide arms at an position beyond that permitted when the subassembly is mounted in the cartirdge.

Wall sections 739 and 780 shown in FIG. 29 are provided with recesses 781 and 782 for accommodating the subassembly of FIG. 30 including slides 173 and 174, and fixed guide part 783 of the guide arm mechanism shown separate from the cartridge in FIG. 30. Wall part 739 is also provided with a notch 784, FIG. 29, which accommodates shifting movement of flange 152 of arm 151 which is actuated by pin 93, FIGS. 6 and 7, for example, so as to pivot tape drag part 94 to the release position relative to the cooperating part 96 in the loading position of the transport mechanism such as illustrated in FIG. 6 or FIG. 14. As illustrated in FIG. 7, as the transport is moved to the operating position, flange 152 is disengaged from pin 93, allowing flange part 152 to be shifted back to the position relative to notch 784 shown in FIG. 29 as the arm 151, FIG. 27, pivots in the counterclockwise direction about shaft 95 to apply drag pressure to the tape.

Wall parts 739 and 780 define a clearance opening 790 which receives the rollers 171 and 172, FIG. 1, or 725, 726, FIG. 14, as the cartridge is pivoted into the operating position on a transport mechanism. The notch 790 is so disposed as to enable the rollers 171, 172 or 725, 726 to engage inclined surfaces 791 and 792 of slides 173 and 174, FIG. 30, as the cartridge is pivoted into the operating position.

FIG. 30 shows a bottom plan view of the tape guide mechanism as it appears when removed from the cartridge. The arms 132 and 133, in this condition, are pivoted further apart than their normal position in the cartridge as shown in FIG. 27 because of the action of a tension spring 794, one end of which is secured to a pin 795 on slide 174 and the other end of which is secured to a pin 796 carried by slide 173. In the condition of the cartridge as shown in FIG. 2, pins 801 and 802 carried by arms 132 and 133 press portions of the tape toward wall portions 803 and 804, FIG. 27. Cover 720 overlies the top edge of the tape path 725 where it extends about pins 801 and 802 so as to prevent upward displacement of the tape at this tape path section, while arms 132 and 133 are provided with ledge portions 811 and 812 which underlie the lower edges of the tape at this tape path section preventing downward displacement of the tape. During loading of the cartridge, rollers such as 171, 172 or 725, 726 ride upwardly along the inclined edges 791 and 792, FIG. 30, forcing slide plates 173 and 174 laterally outwardly against the action of spring 794. Slides 173 and 174 are pivotally coupled to links 821 and 822 which have elongated slots accommodating the lateral movement of the slides while transmitting rotational movement to shafts 95 and 135. The shafts 95 and 135 are secured to the arms 132 and 133 so as to pivot the arms to the inward positions shown in FIG. 3 as the cartridge is pivoted downwardly into the operating position.

It will thus be understood that the present invention provides a cartridge adapted for coupling to a stable drive system, the cartridge having no rotating parts except for the tape turntable or reel 120 and requiring no rollers or precision parts that affect the drive accuracy. Thus, guide element 735 providing the guide surface 130 is a fixed non-rotating member as are the other parts of the system which engage the tape in the operating mode as shown in FIG. 3. The drive which is accommodated by the cartridge is reliable and relatively free of maintenance requirements, using no belts or pulleys. The capstan drive configuration is such that the head is freely movable from one edge of the tape to the other for scanning relation with a multiplicity of channels on the tape. The cartridge provides a resiliently biased drag element 94 with a pad 94*a*, FIG. 2, engaging the active surface of the tape for increasing the tape tension above that of the tension which would otherwise be present, prior to the first engagement of the tape with the capstan drive. By way of example, the cartridge may be of an extremely compact configuration having outside dimensions of about 8½ inches by 7 inches and a depth dimension of about ¾ inch. As seen in FIG. 3, for example, the length dimension of the transport mechanism is only slightly greater than the length dimension of the cartridge, and the width dimension of the transport mechanism essentially corresponds to the width dimension of the cartridge. The height dimension of the transport mechanism, as illustrated in FIG. 8, may be determined essentially by the overall height of the capstan drive motor 226 and capstan drive assembly 14. The electronics except for the conventional circuitry of a broadcast television receiver may all be contained within a housing such as indicated at 601 in FIG. 19.

MISCELLANEOUS SYSTEM INFORMATION

As previously explained, with a single channel head assembly, the cartridge of the foregoing dimensions provides a playing time of at least 1 hour on 40 channels of a one-quarter inch tape where the tape moves at 120 inches per second. Response of 2.5 megahertz to 3.0 megahertz has been obtained, limited mainly by present electronic circuits rather than by other components of the system. The transducer head may supply reproduced signals through any television set by connecting to the antenna terminals via a small radio frequency adapter. A relatively narrow head for recording 60 channels of video signal on ¼ inch tape has been tested. Strong clear recordings were made and played back, very similar to the results of the more usual 40 track system. Even at 60 tracks the limit has not been reached, so that a choice of forty tracks appears conservative. The head used for 60 track recordings had a 2 mil track width and a 20 microinch gap. The head had a single lamination of 2 mil thickness. The head core may be of 6.5% silicon with a 45° orientation as described in reference to the ninth figure of Camras U.S. Pat. No. 3,582,572. The winding arranged as shown in said ninth figure may comprise 365 turns of No. 46 wire AWG connected in series with 120 turns of No. 42 wire for use in aiding relation at low frequencies during playback, the 120 turns being wound on top of the 360 turns and being used alone during recording. Sound may be recorded by the same head unit as the video with the use of a multiplex sound as described in Camras U.S. Pat. No. 3,506,780 dated Apr. 14, 1970. The pulse modulator is designed for triggering only by the leading edge of the horizontal rate pulses of the video signal. The circuit includes a free running multivibrator locked to the horizontal scan frequency to supply pulses delayed four or five microseconds from the leading edge of the sync pulses, a monostable multivibrator supplying the delayed keying pulses, and gate circuits that alternate between picture and sound. The resulting sound has been excellent.

The capstan-flywheel-rotor is dynamically balanced so as to reduce vibration and noise to a negligible amount. The tape in the cartridge may be coated with a lubricant on the back (inactive) face. The cabinet for the transport mechanisms may be such that all working parts are enclosed in black aluminum and stainless steel. The cartridges may be enclosed in plastic slip-over boxes of the same size substantially as the cartridges, or of the configuration illustrated in FIG. 18.

The playback circuits may include a direct current feedback from the output collector to the input emitter for improved stability. This prevents drifting when the amplifier is heated after long operation in a poorly vented housing.

The mounting of the magnetic core for the head assembly may conform with the teachings of Camras U.S. Pat. No. 3,543,177 dated Oct. 13, 1970. For the case of a head unit for scanning forty successive channels on a ¼ inch tape, the core may comprise a single lamination 4 mils thick, the core C-shaped sections having an inside diameter of 0.070 inch, an outside diameter of 0.110 inch and a gap depth of 2 mils and a gap length in the direction of a tape movement of 30 microinches. The core material may be 6.5% silicon steel with a 45° orientation as in the ninth figure of Camras U.S. Pat. No. 3,582,572, with 120 turns wound on top of 360 turns, the magnetic shield being thinned at the top near the pole pieces to approximately 5 mil thickness, and the silver inserts at the tape path at the sides of the pole pieces having a thickness of about 2 mils at each side of the pole pieces. The non-magnetic portion of the tape contact surface may have a chrome plating ¼ mil thick. Recording high frequency bias frequency may be 11 megacycles per second, for example. The tape engaging portion of the pole pieces and the two mil wide silver side supports may be crowned laterally generally as indicated in the first figure of said U.S. Pat. No. 3,582,572. The inductance of the 120 turn winding section used during recording was measured at 218 microhenries, with a resistance of 6.9 ohms and a Q of about 0.188 at 1000 Hertz. The inductance of the 365 turn winding was measured at about 1590 microhenries with a resistance of 31.1 ohms and a Q of about 0.31 at 1000 Hertz. The inductance of both windings, with a total of 485 turns in series aiding at low frequencies had an inductance measured at 2630 microhenries, a resistance of 38.0 ohms and a Q of about 0.41. Preferably the horizontal and vertical sync pulses of the composite video signal are emphasized by superimposing thereon horizontal and vertical sync pulses from the sync separator of the television set. An emitter follower may be interposed between the sync separator and the base electrode of the video output amplifier to prevent loading of the sync circuits. This gives a more stable picture with low distortion, especially of the vertical lines when hum harmonics and other extraneous components are present. It also counteracts the effects of a lack of low frequency response, operating especially well where the frequency response falls rapidly below about 2.0 kilohertz.

The foregoing specific exemplary parameters are given by way of example only and not by way of a limitation, particularly in order to facilitate the construction of a complete system utilizing the features of the present invention.

The depth dimension of the housing 601 in FIG. 19 between its front and rear walls may be decreased considerably by moving the cartridge mounting elements such as 307 forwardly. This simply increases the degree to which the cartridge 11 extends beyond the rear wall of the housing. Recesses 755 and 756, FIG. 29, thus could be located at the mid region of the cartridge, rather than at the rear as actually shown. The housing 601 may be shortened in this way by ⅓ to ½, for example, since the rear half of the housing 601 as actually shown in FIG. 19 contains no mechanism, and since this space is not required to house the electronic circuitry.

SUMMARY OF OPERATION

(FIGS. 19–30)

The features of FIGS. 19–26 may be applied to any of the embodiments herein, and the following summary of operation should be considered as specifically applied to each embodiment.

In applying the cartridge to the transport mechanism of FIG. 19, lugs on the transport are interlocked with ledge strips 757 and 758, FIG. 29, and the cartridge pivoted downwardly so as to apply tape section 25 between the capstan drive assembly 301 and the transducer head associated with head indexing control knob 418, FIG. 19. Operating lever 610 serves to advance capstan pressure rollers and the head to the operating position and at the same time to lock cartridge 11 in association with the transport. Knob 606 selects play or record mode, knob 607 selects a manual mode where the transport mechanism is returned to the load position manually only by actuation of a button 604, and an automatic position where the mechanism is returned to load position automatically as the head finishes scanning the last channel on the tape, for example channel No. 40, and returns to the position for again scanning channel No. 1. Switch 609 in one position disables automatic head indexing so that the head continues to scan a given channel until the channel is manually changed either by means of the channel selector knob 418 or by means of the push button 701. In the second position of switch 609, a photo cell serves to sense the end of each channel and energizes an automatic head indexing mechanism so that the head will sequentially scan each successive channel on the tape. With knob 607 in the manual position the head will repeatedly scan the successive channels, starting over again with the first channel after the last one has been scanned, to give a repeated playback of the recorded information without any interruptions until button 640 is actuated to discontinue the operation of the system.

To explain the foregoing operation in somewhat greater detail, the cartridge 11 is loaded on the machine by placing recesses 755 and 756, FIG. 29, in the bottom of the cartridge over lugs such as shown in 304 and 305 in FIG. 14, after which the cartridge is pressed rearwardly slightly as it is pivoted downwardly so as to interengage fingers 304*a* and 305*a* in a hooked interlocking relation with ledges such as indicated at 757*a*, FIG. 29.

When the cartridge has pivoted downwardly to the operating position shown in FIG. 19, operation of lever 610, FIG. 19, causes roller 613, FIG. 20, to operate in slot 614, FIG. 14, to move the operating parts of the transport mechanism to the operating position shown in FIG. 15. In this operating position, strips such as indicated at 525, FIG. 15, overlie regions such as indicated at 761 and 762, FIG. 27, of the cartridge 11 to prevent an attempt at removal of the cartridge from the mechanism until the transport mechanism is returned to the load position. The transport mechanism includes a shiftable carriage which is spring urged to the load position and is retained in the operating position by means of the latch between parts 622 and 624, FIG. 21. This latch can be manually released by depressing button 640, FIG. 21, or can be automatically released as the head bracket 381, FIGS. 11 and 12, returns to the upper position after the head has scanned each successive channel on the tape. More particularly, the head bracket as it moves to upper position will engage with lug 661, FIG. 22, shifting the lug counterclockwise as viewed in FIG. 22 to raise bar 632, FIGS. 21 and 22, sufficiently to release the latch of the transport mechanism carriage, the carriage return spring then automatically returning the transport mechanism to the loading position such as indicated in FIG. 14, whereupon the mechanism reverts to a stopped or standby condition and the cartridge can be removed and replaced if desired.

The switch 609 may control contact 609*a*, FIG. 15A, so as to prevent automatic indexing in one position thereof, while allowing automatic indexing under the control of photocell 303 in the other (closed) position. A hand-held switch 800 is shown in FIG. 19 which is adapted to be held in the hand while viewing the screen 811 of the television set 810. By depressing button 801, the contacts of socket 804, FIG. 15A, are interconnected so as to actuate transistor switch 542 and initiate a channel change operation. Thus, the operator can very conveniently select a desired channel on the tape by referring to the display of the successive channels on the screen 811 as the button 801 is successively actuated.

The control 617 in FIG. 19 operates in conjunction with the record-play selector 606 as illustrated in FIGS. 23–26. In record mode as illustrated in FIGS. 25 and 26, switch 720 controlling the recording head circuit is not actuated until button 617 is depressed. Thus, a program being displayed on screen 711 of television set 710, FIG. 19, can be monitored without recording, but with the tape transport in operation. When recording is desired, the button 617 is pressed and is latched in the down position. Recording continues until the record-play knob 606 is turned to "play" position. Playback is immediate. In the play position, the record button 617 releases automatically, and cannot be latched even if depressed, thus providing a safety feature since the machine will not assume recording operation until activation of both the record-play selector knob 606 to record position and subsequent pressing of record button 617. As illustrated in FIG. 19, all controls for monitoring and record-playback are on the transport mechanism, with a single cable 812 that plugs into the television receiver such as indicated at 810.

The operation of the cartridge features shown in FIGS. 27–30 has been previously described in connection with the disclosure of the embodiment of FIGS. 1–9.

We claim as our invention:

1. In a cartridge transducing system, wherein a cartridge has a pair of pivotal guide arms for guiding a tape record medium of the cartridge along a loading tape path at an open end of the cartridge, and a cartridge support has a capstan drive assembly for reception at one side of the path and a head and capstan pressure rollers for reception at the other side of the path as the cartridge is moved downwardly to an operating position, the improvement comprising a cam actuator coupled with said pivotal guide arms, and including cooperating parts on the support and cartridge arranged so that as the cartridge is moved into operating position the cam actuator is actuated to swing the pivotal guide arms to an inactive position clear of the transducing path of the tape record medium.

2. A system according to claim 1 with said cartridge having laterally shiftable slide parts biased toward each other for holding said arms in an extended configuration to guide the record medium along said path, said slide parts having respective opposed upwardly converging cam edges, and said support having spaced elements which engage said edges to force said slide parts laterally away from each other against the action of the bias thereon, and linkages coupling the slide plates with the respective pivotal guide arms for swinging the guide arms to said inactive position as said slide parts are forced laterally away from each other.

* * * * *